US012682057B2

(12) United States Patent
Badragan et al.

(10) Patent No.: US 12,682,057 B2
(45) Date of Patent: Jul. 14, 2026

(54) CLOUD-BASED FILE INTEGRITY MONITORING

(71) Applicant: CrowdStrike, Inc., Sunnyvale, CA (US)

(72) Inventors: Silviu-Alexandru Badragan, Bucharest (RO); Andrei-Viorel Cotiga, Bucharest (RO); Adam Freund, Bothell, WA (US); Samantha Alyn Goresh, Somerville, MA (US); Ioan Tinca, Bucharest (RO)

(73) Assignee: CrowdStrike, Inc., Sunnyvale, CA (US)

( * ) Notice: Subject to any disclaimer, the term of this patent is extended or adjusted under 35 U.S.C. 154(b) by 63 days.

(21) Appl. No.: 18/678,089

(22) Filed: May 30, 2024

(65) Prior Publication Data

US 2025/0371154 A1 Dec. 4, 2025

(51) Int. Cl.
| | |
|---|---|
| *H04L 67/10* | (2022.01) |
| *G06F 9/445* | (2018.01) |
| *G06F 15/16* | (2006.01) |
| *G06F 21/56* | (2013.01) |
| *H04L 9/40* | (2022.01) |
| *H04L 15/16* | (2006.01) |

(Continued)

(52) U.S. Cl.
CPC ............ *G06F 21/565* (2013.01); *H04L 67/10* (2013.01)

(58) Field of Classification Search
CPC ............................... G06F 21/565; H04L 67/10
USPC ......................................................... 726/22
See application file for complete search history.

(56) References Cited

U.S. PATENT DOCUMENTS

| | | | |
|---|---|---|---|
| 8,055,613 B1 | 11/2011 | Mu et al. | |
| 11,558,401 B1 * | 1/2023 | Vashisht | ............. H04L 63/1416 |

(Continued)

FOREIGN PATENT DOCUMENTS

| | | |
|---|---|---|
| KR | 20020065976 | 8/2002 |

OTHER PUBLICATIONS

Creating and editing an Integrity Monitoring rule Kaspersky, https://support.kaspersky.com/ksvla/5.0/en-US/74318.htm, accessed on or about Feb. 29, 2024.

(Continued)

*Primary Examiner* — Berhanu Shitayewoldetadik
(74) *Attorney, Agent, or Firm* — Law of Scott P. Zimmerman, PLLC

(57) ABSTRACT

A cloud-based file integrity monitoring service identifies content changes to a computer file. An endpoint cybersecurity agent monitors its host client device for read/write and other operating system events associated with the computer file. When the endpoint cybersecurity agent detects each operating system event, the endpoint cybersecurity agent captures and reports, in real time or near real time, a snapshot of the file content representing the computer file. So, as the host client device changes the computer file with each operating system event, the endpoint cybersecurity agent uploads timestamped snapshots of the file content to a cloud-based file integrity monitoring service. The cloud-based file integrity monitoring service stores each snapshot of the file content, thus logging a change history for the computer file. The cloud-based file integrity monitoring service may thus retrieve and analyze different snapshots at different points in time, thus quickly identifying the content changes to the computer file.

20 Claims, 21 Drawing Sheets

(51) Int. Cl.
  *H04L 29/08* (2006.01)
  *H04L 67/00* (2022.01)
  *H04L 67/1095* (2022.01)

(56) References Cited

U.S. PATENT DOCUMENTS

| | | | | |
|---|---|---|---|---|
| 11,595,437 | B1 * | 2/2023 | Mushtaq | H04L 63/20 |
| 2007/0233971 | A1 * | 10/2007 | Keithley | G06F 3/0643 |
| | | | | 711/154 |
| 2010/0035226 | A1 * | 2/2010 | Lu | G09B 7/02 |
| | | | | 434/350 |
| 2015/0331755 | A1 | 11/2015 | Morgan | |
| 2016/0202972 | A1 * | 7/2016 | Sass | G06F 8/75 |
| | | | | 717/121 |
| 2018/0048658 | A1 * | 2/2018 | Hittel | H04L 63/1433 |
| 2018/0183462 | A1 * | 6/2018 | Gopal | H03M 7/30 |
| 2019/0007455 | A1 * | 1/2019 | Sheng | H04L 63/1416 |
| 2021/0044496 | A1 * | 2/2021 | Snyder | H04L 47/821 |
| 2022/0129551 | A1 * | 4/2022 | Collier | G06F 21/565 |
| 2022/0166781 | A1 * | 5/2022 | Hittel | G06F 21/552 |
| 2022/0345482 | A1 * | 10/2022 | Shua | G06F 21/568 |
| 2024/0160737 | A1 * | 5/2024 | Choi | G06F 21/14 |

OTHER PUBLICATIONS

"How Snare helps with FIM, FAM, RIM and RAM," Snare, https://www.snaresolutions.com/wp-content/uploads/2020/03/FIM-with-Snare-1.pdf, accessed on or about Feb. 29, 2024.

"File Integrity Monitoring using the Log Analytics agent," Microsoft Defender for Cloud | Microsoft Learn, https://learn.microsoft.com/en-us/azure/defender-for-cloud/file-integrity-monitoring-enable-log-analytics, accessed on or about Feb. 29, 2024.

"Create an Integrity Monitoring rule," Trend Micro Cloud One™ Documentation, https://cloudone.trendmicro.com/docs/workload-security/integrity-monitoring-rules-create/, accessed on or about Feb. 29, 2024.

"Enable near real-time file monitoring and 'who made the change' detection in SCM," https://documentation.solarwinds.com/en/success_center/scm/content/scm-enable-real-time-file-monitoring.htm, accessed on or about Feb. 29, 2024.

"Enable or disable content downloading for an element in SCM," https://documentation.solarwinds.com/en/success_center/scm/content/scm-content-downloading.htm, accessed on or about Feb. 29, 2024.

"See configuration changes between two points in time using SCM," https://documentation.solarwinds.com/en/success_center/scm/content/scm-see-configuration-changes-between-two-points-in-time.htm, accessed on or about Feb. 29, 2024.

* cited by examiner

Figure 3:
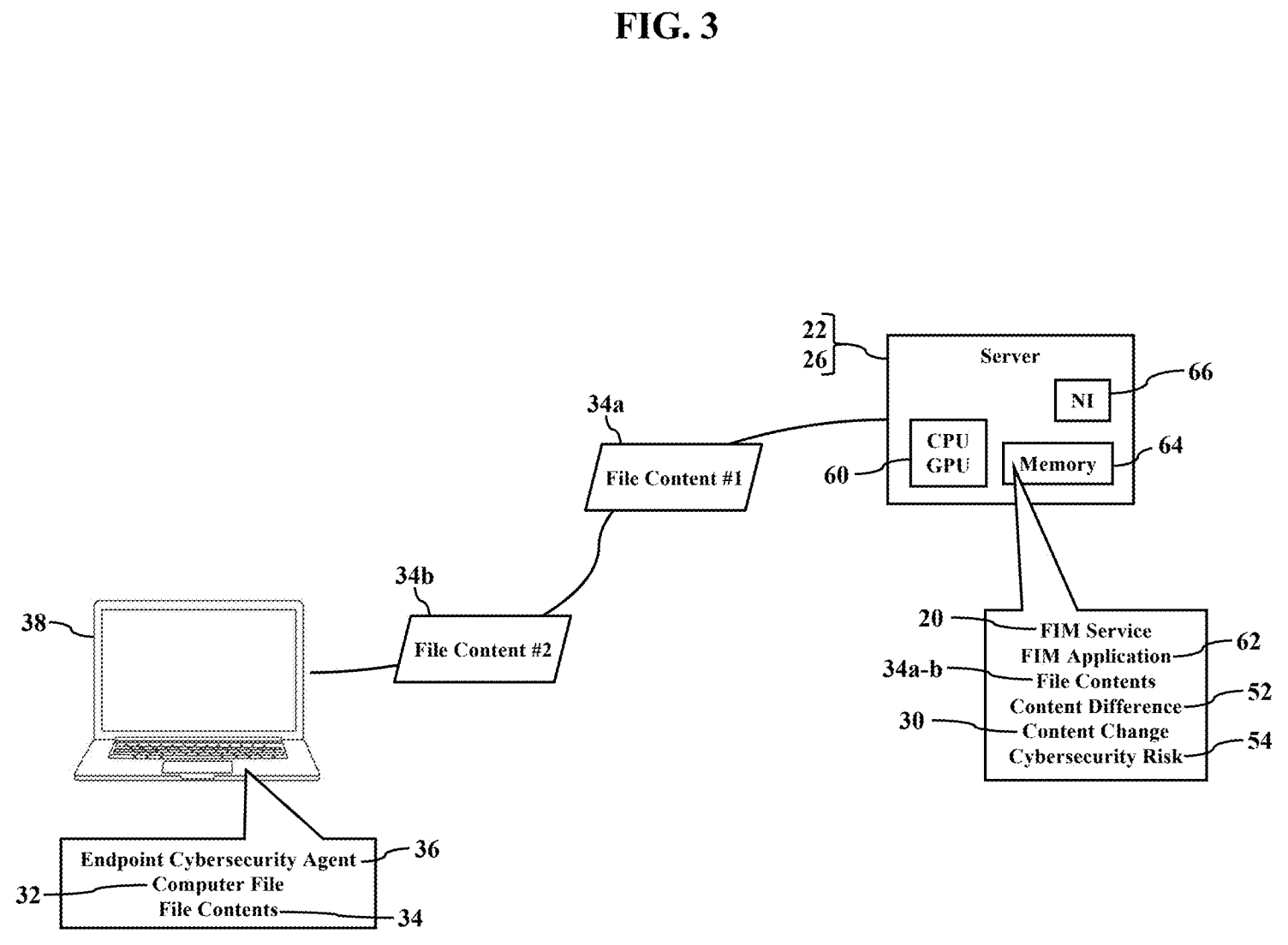

Server 22
26

NI — 66

Memory — 64

CPU
GPU — 60

FIM Service — 20 — 62
FIM Application
File Contents — 34a-b — 52
Content Difference
Content Change — 30
Cybersecurity Risk — 54

File Content #1 — 34a

File Content #2 — 34b

38

Endpoint Cybersecurity Agent — 36
Computer File — 34
File Contents

Figure 11:
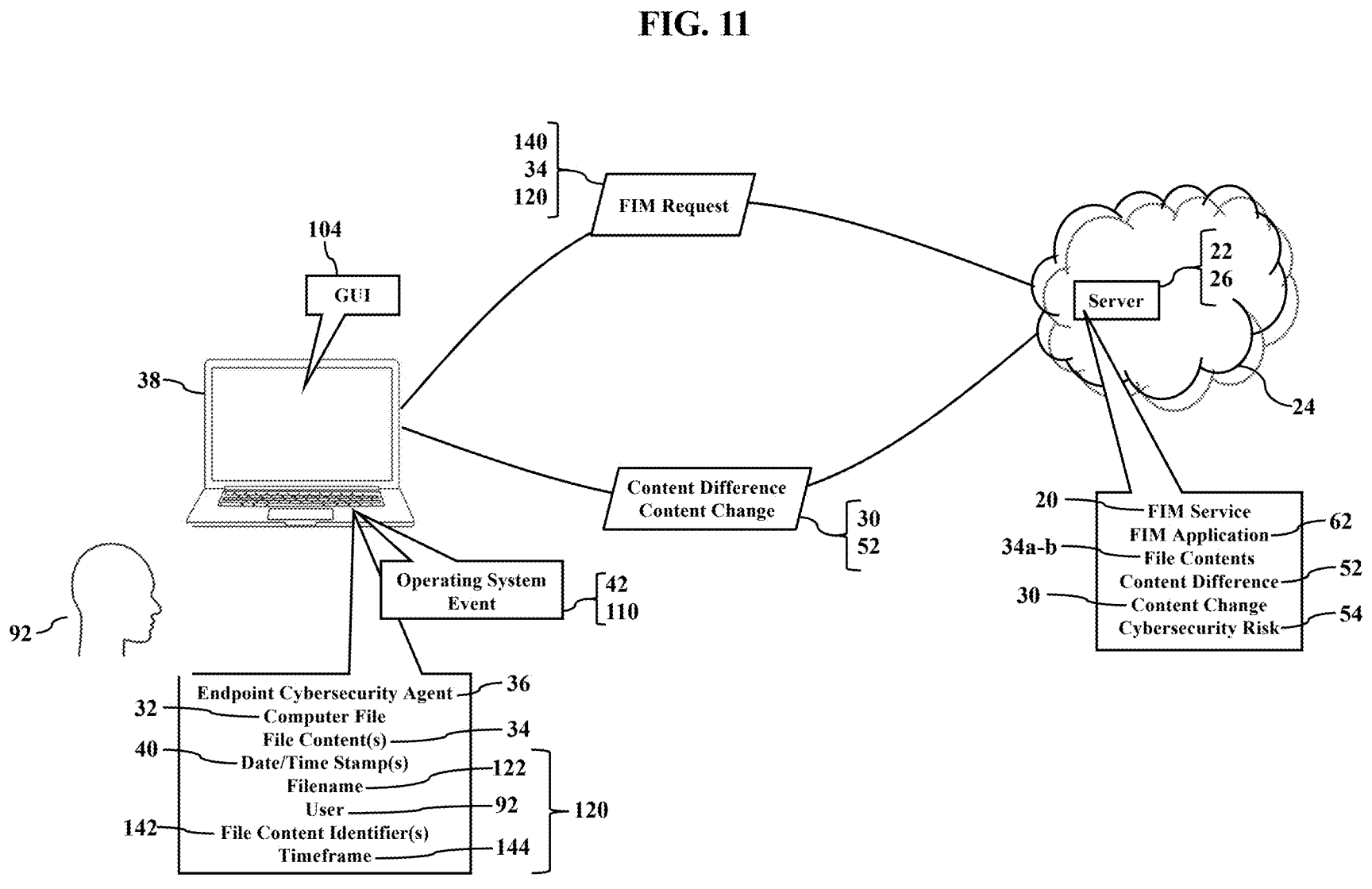

- Server — 24
- 22
- 26

- FIM Service — 20
- FIM Application — 62
- File Contents — 34a-b
- Content Difference — 52
- Content Change — 30
- Cybersecurity Risk — 54

- FIM Request — 140, 34, 120
- Content Difference — 30
- Content Change — 52

- Operating System — 42
- Event — 110

- GUI — 104
- 38

- Endpoint Cybersecurity Agent — 36
- Computer File — 32
- File Content(s) — 34
- Date/Time Stamp(s) — 40
- Filename — 122
- User — 92
- File Content Identifier(s) — 142
- Timeframe — 144
- 120

Figure 16:
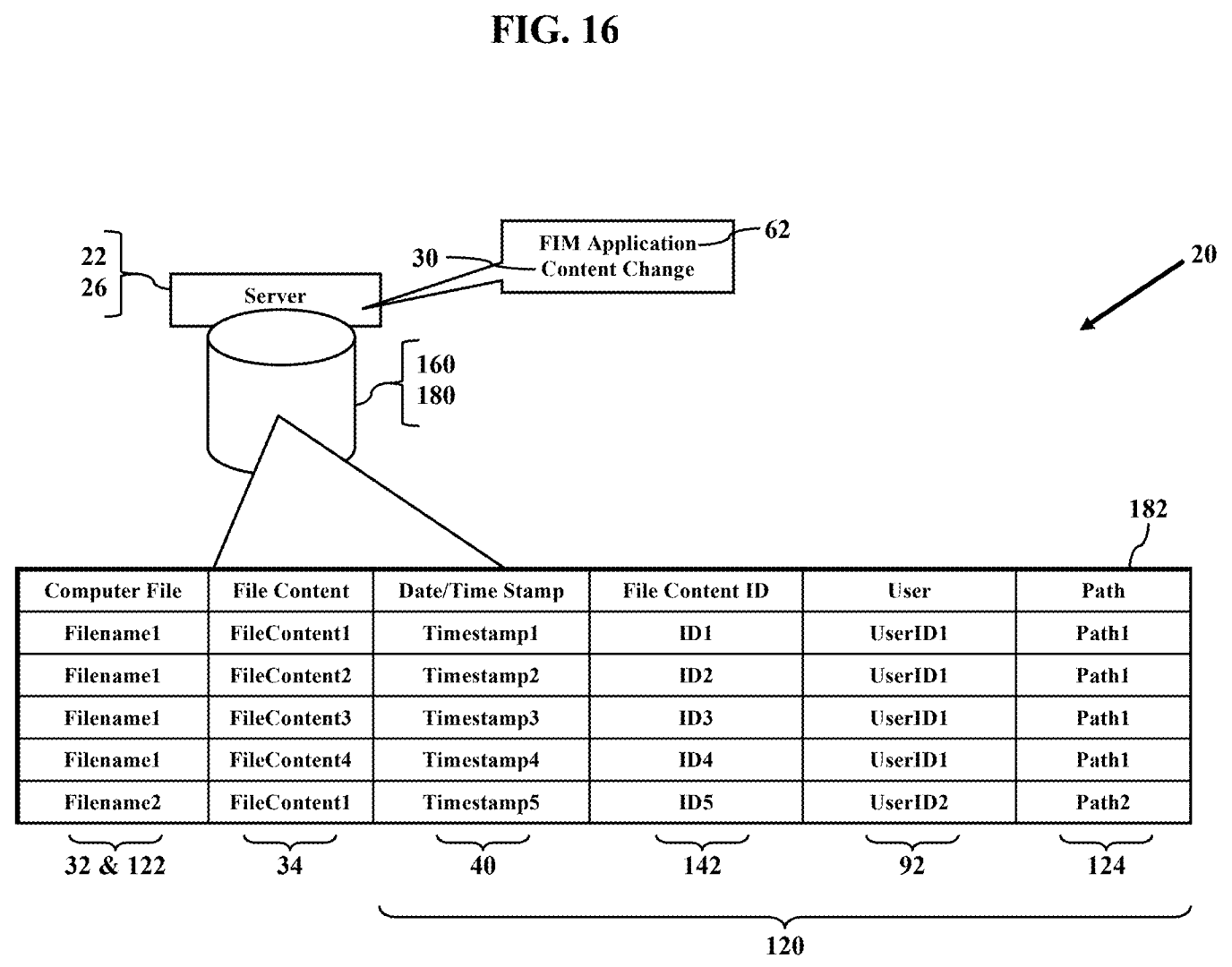

62 — FIM Application
Content Change

30

Server 160
180

22
26

182

| Computer File | File Content | Date/Time Stamp | File Content ID | User | Path |
|---|---|---|---|---|---|
| Filename1 | FileContent1 | Timestamp1 | ID1 | UserID1 | Path1 |
| Filename1 | FileContent2 | Timestamp2 | ID2 | UserID1 | Path1 |
| Filename1 | FileContent3 | Timestamp3 | ID3 | UserID1 | Path1 |
| Filename1 | FileContent4 | Timestamp4 | ID4 | UserID1 | Path1 |
| Filename2 | FileContent1 | Timestamp5 | ID5 | UserID2 | Path2 |

Figure 18:
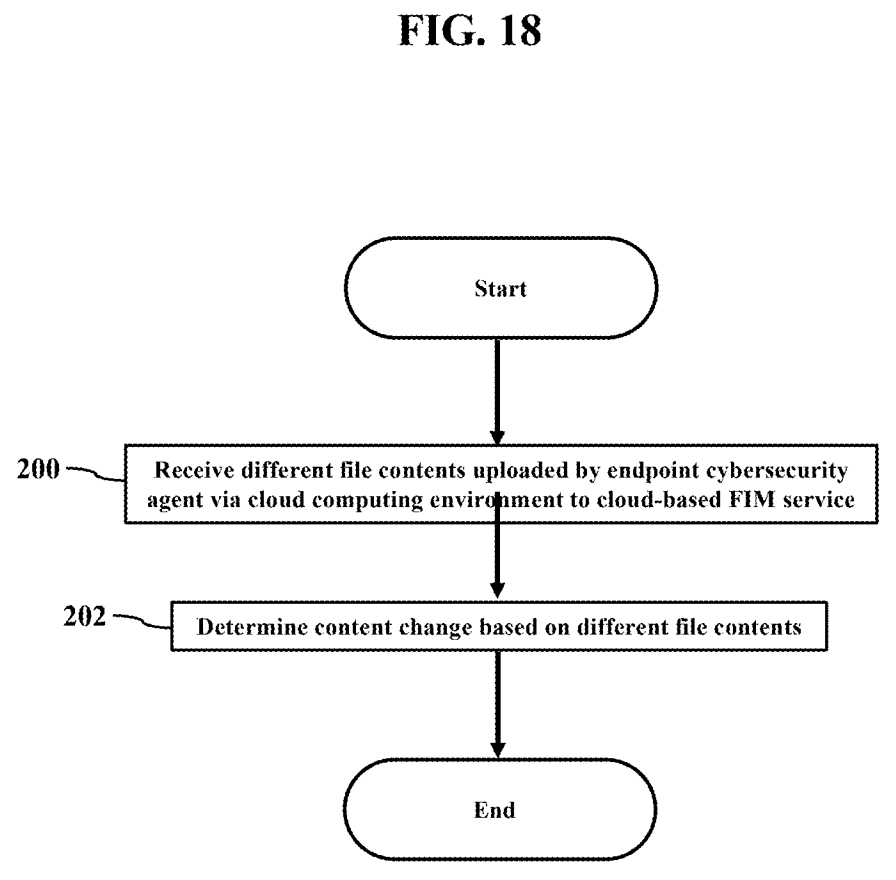

Start

200 — Receive different file contents uploaded by endpoint cybersecurity agent via cloud computing environment to cloud-based FIM service 202 — Determine content change based on different file contents End Start 210 — Receive different file contents uploaded by endpoint cybersecurity agent via cloud computing environment to cloud-based FIM service 212 — Identify content difference between different file contents 214 — In response to identifying content difference, determine content change to computer file as service response End

FIG. 20

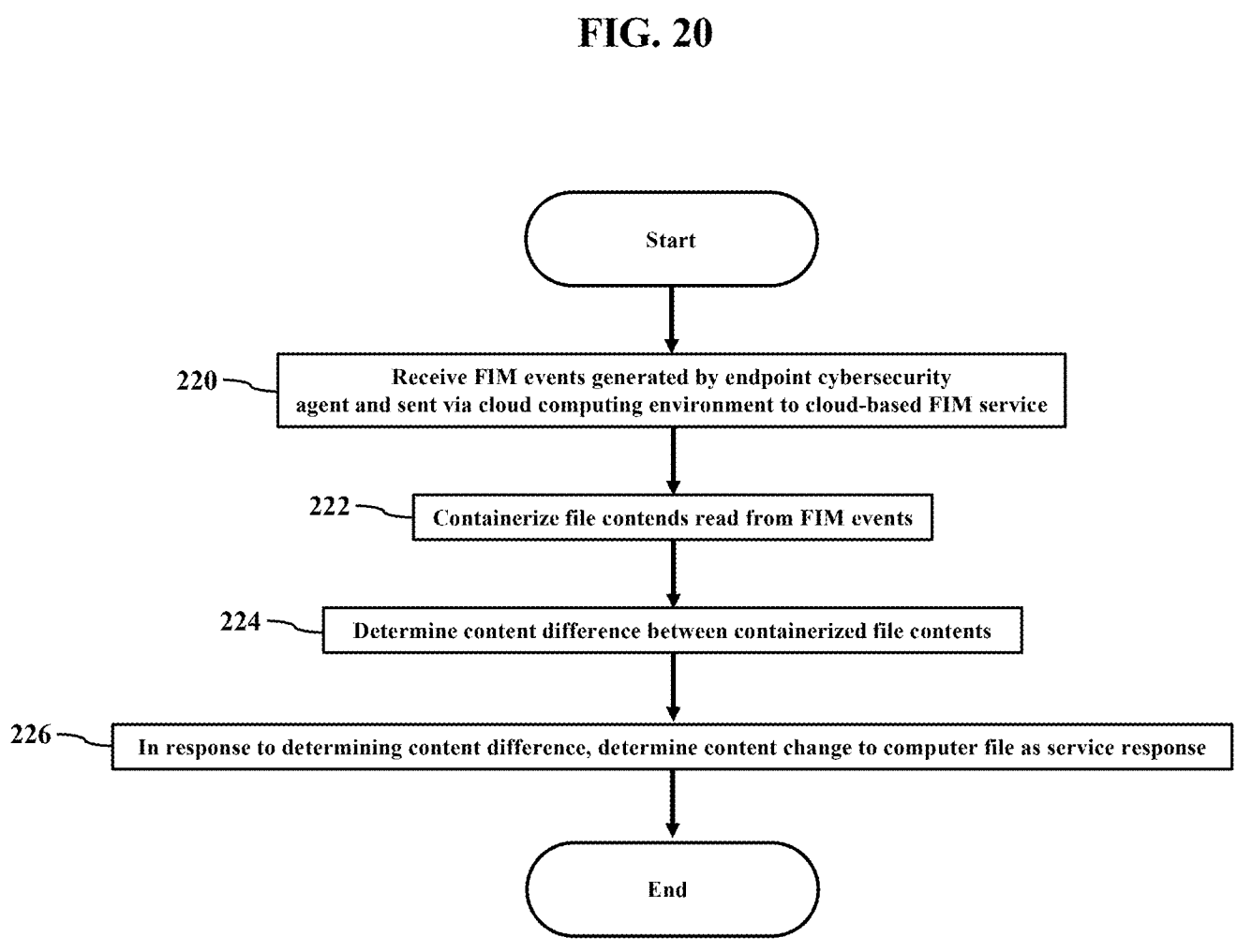

Start

220 — Receive FIM events generated by endpoint cybersecurity agent and sent via cloud computing environment to cloud-based FIM service 222 — Containerize file contends read from FIM events 224 — Determine content difference between containerized file contents 226 — In response to determining content difference, determine content change to computer file as service response End

CLOUD-BASED FILE INTEGRITY MONITORING

BACKGROUND

The subject matter described herein generally relates to computers and, more particularly, the subject matter relates to computer security and to file integrity monitoring.

File integrity monitoring reduces cybersecurity risks. Some changes to computer files may reduce a security posture and even open unwanted doors to security breaches. File integrity monitoring, though, catches even small file changes and alerts IT personnel.

SUMMARY

A cloud-based file integrity monitoring service identifies content changes to a computer file. An endpoint cybersecurity agent monitors its host client device for read/write and other operating system events associated with the computer file. When the endpoint cybersecurity agent detects each operating system event, the endpoint cybersecurity agent captures and reports, in real time or near real time, a snapshot of the file content representing the computer file. The endpoint cybersecurity agent uploads the snapshot of the file content to the cloud-based file integrity monitoring service. So, as the host client device changes the computer file, the endpoint cybersecurity agent uploads timestamped snapshots of the file content to the cloud-based file integrity monitoring service. The cloud-based file integrity monitoring service stores each timestamped snapshot of the file content, thus logging a content change history for the computer file. The cloud-based file integrity monitoring service may also retrieve and analyze different snapshots at different points in time, thus quickly revealing who changed the computer file and how the file content of computer file changed over time.

BRIEF DESCRIPTION OF THE SEVERAL VIEWS OF THE DRAWINGS

The features, aspects, and advantages of the cloud-based file integrity monitoring service are understood when the following Detailed Description is read with reference to the accompanying drawings, wherein:

FIGS. 1-2 illustrate some examples of a cloud-based file integrity monitoring (or FIM) service;

FIG. 3 illustrates more examples of the cloud-based FIM service;

FIG. 4 illustrates still more examples of the cloud-based FIM service;

FIG. 5 illustrates examples of outsourcing;

FIG. 8 illustrates yet more examples of the FIM service;

FIGS. 9-10 illustrate examples of data manipulation;

FIG. 11 illustrates examples of request and response mechanisms;

FIGS. 13-16 illustrate examples of cloud storage;

FIG. 17 illustrates more examples of architectural design;

FIGS. 18-20 illustrate examples of methods or operations for the FIM service.

DETAILED DESCRIPTION

Figure 6:
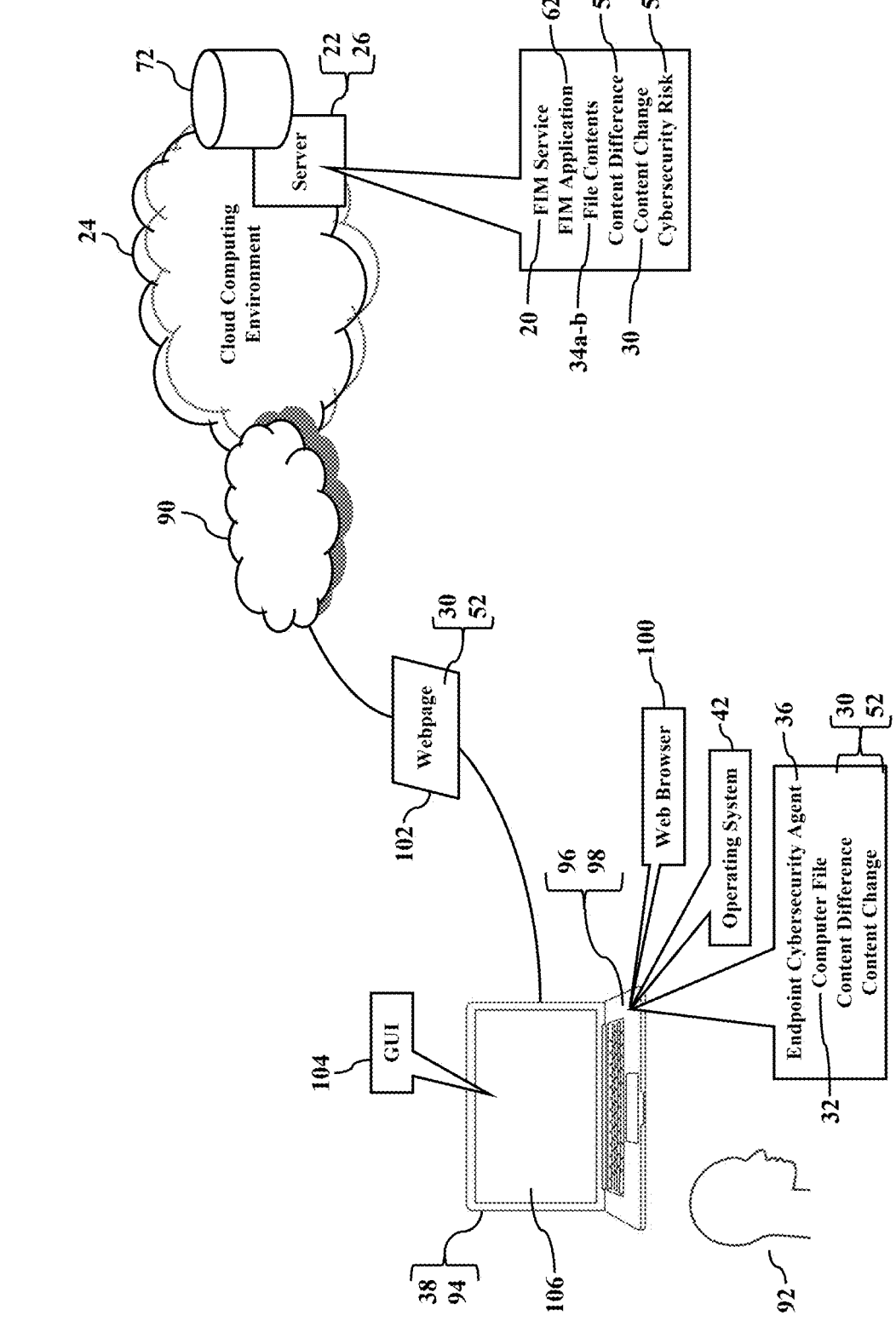
FIG. 6 illustrates examples of web interfacing and client updating.

Some examples relate to detecting changes to a computer file. As we know, nearly every day we read of another network hack, computer virus, or other cybersecurity risk. To stop these cybersecurity risks, many prudent computer users and companies monitor the content of computer files. Most changes to a computer file are legitimate and pose no cybersecurity risk. Some changes, though, may be caused by nefarious users and/or malicious software. If changes to computer files are monitored, then cybersecurity risks may be stopped before damage is done.

A file integrity monitoring (or "FIM") service detects changes to a computer file. When a client computer attempts to change the computer file, an endpoint cybersecurity agent alerts the cloud-based FIM service. The endpoint cybersecurity agent is a software program that is installed to the client computer. The endpoint cybersecurity agent, in particular, cooperates with an operating system to detect read/write/access and other operating system events that are associated with the computer file. These operating system events may indicate that a user of the client computer, and/or malicious software, is attempting to change the computer file. When the endpoint cybersecurity agent 36 detects the operating system events, the endpoint cybersecurity agent captures and reports, in real time or near real time, a current snapshot of the file content representing the computer file. So, for example, each time the computer attempts to change the computer file, the endpoint cybersecurity agent uploads timestamped snapshots of the file content to the cloud-based file integrity monitoring service. The cloud-based file integrity monitoring service may then compare different snapshots of the file content to determine content changes to the computer file. Because the content changes may indicate a cybersecurity risk, the cloud-based file integrity monitoring service may alert IT administrators and security personnel. The cloud-based file integrity monitoring service may even instruct the endpoint cybersecurity agent to rollback an operating system event, thus restoring the computer file to a previously stored version.

The cloud-based file integrity monitoring service will now be described more fully hereinafter with reference to the accompanying drawings. The cloud-based file integrity monitoring service, however, may be embodied in many different forms and should not be construed as limited to the examples set forth herein. These examples are provided so that this disclosure will be thorough and complete and fully convey the cloud-based file integrity monitoring service to those of ordinary skill in the art. Moreover, all the examples of the cloud-based file integrity monitoring service are intended to encompass both structural and functional equivalents thereof. Additionally, it is intended that such equivalents include both currently known equivalents as well as equivalents developed in the future (i.e., other elements developed that perform the same function, regardless of structure).

Figure 1:
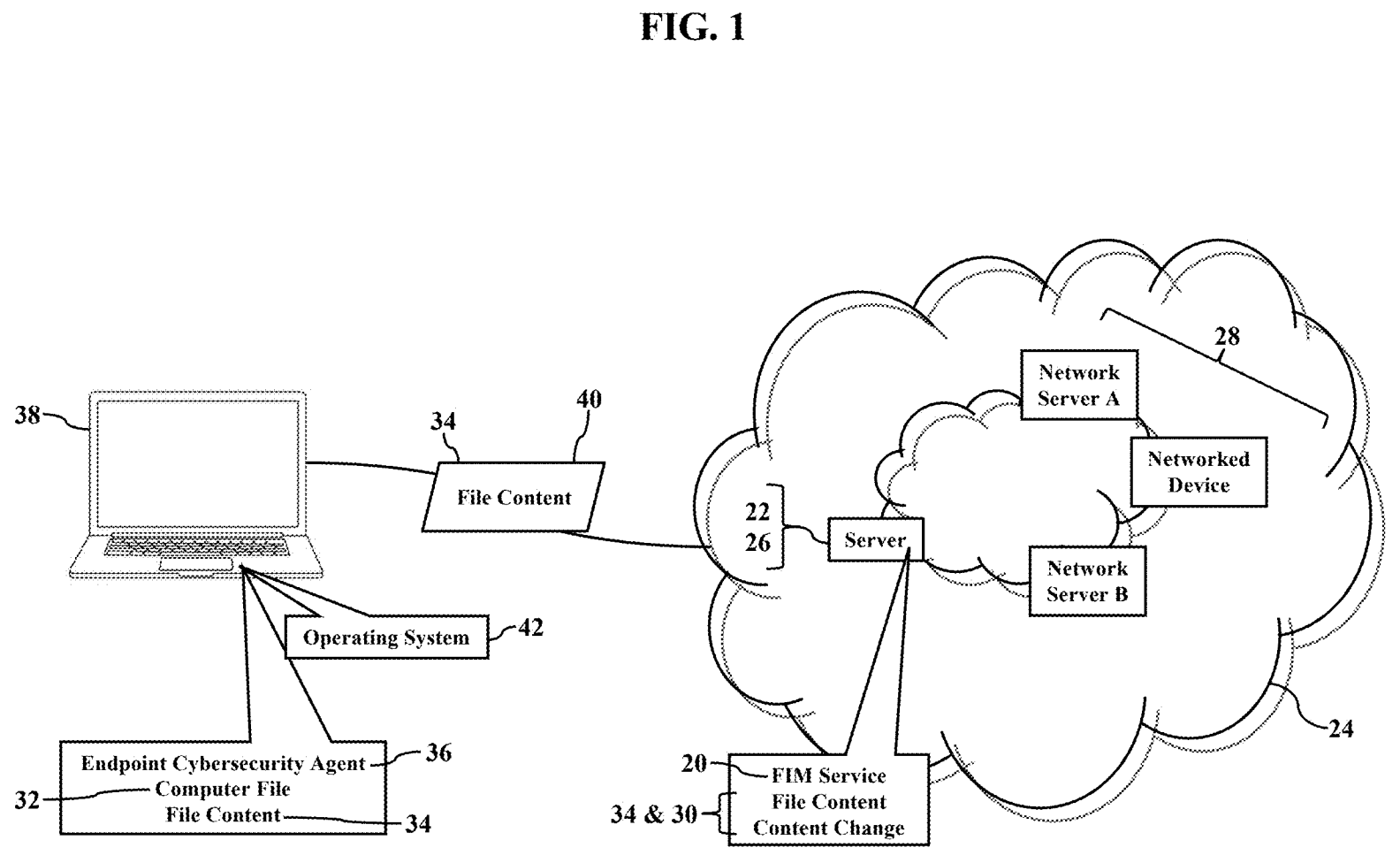
Figure 2:
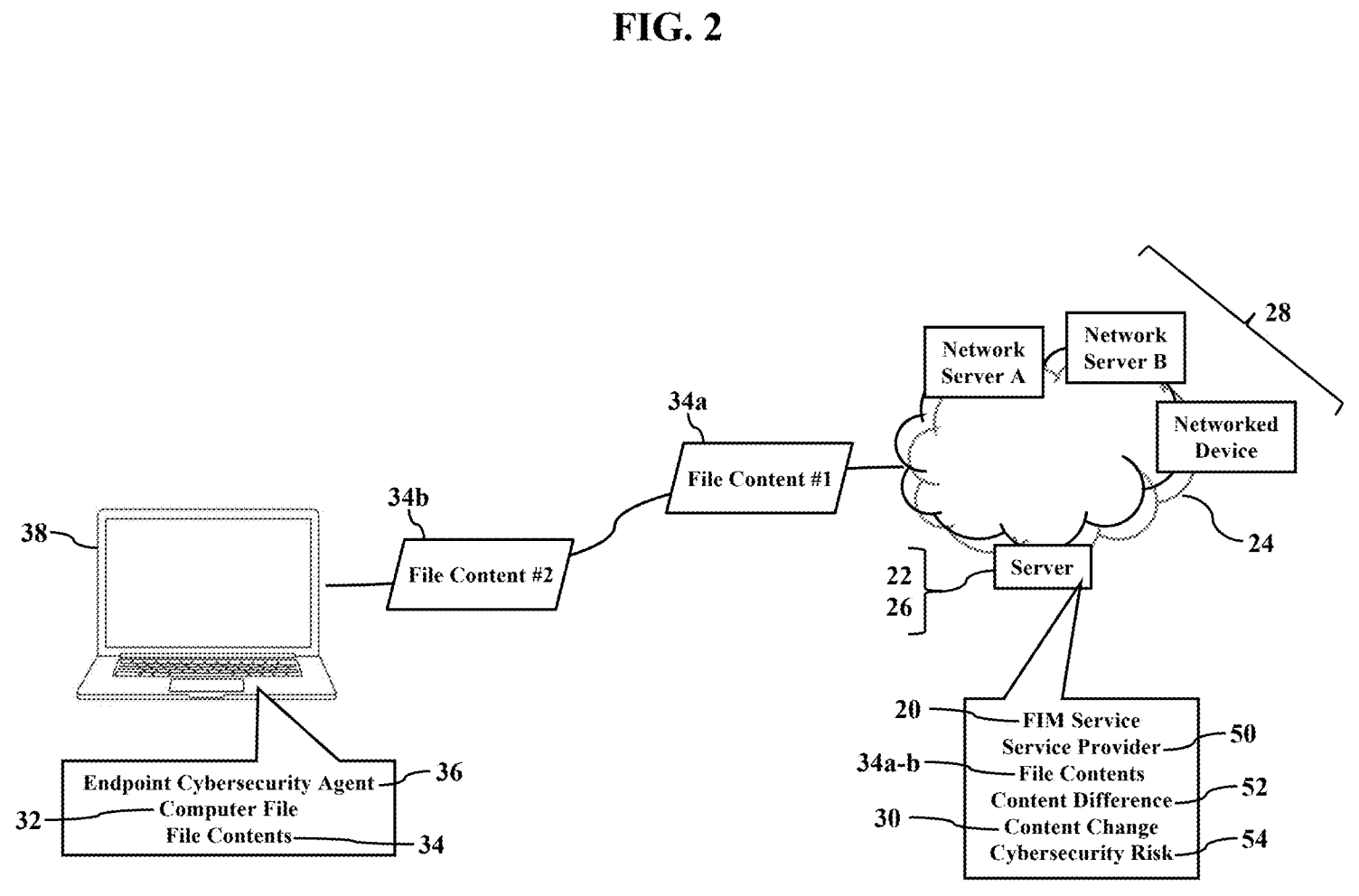

FIGS. 1-2 illustrate some examples of a cloud-based file integrity monitoring (or FIM) service 20. A computer system 22 operates in a cloud computing environment 24. FIG. 1 illustrates the computer system 22 as a server 26. The computer system 22, though, may be a processor-controlled device, as later paragraphs will explain. In this example, the server 26 communicates via the cloud computing environment 24 (e.g., public Internet, private network, and/or hybrid network) with other servers, devices, computers, or other networked members 28 operating within, or affiliated with, the cloud computing environment 24. The server 26 is programmed to determine a content change 30 to a computer file 32, based on different file contents 34 uploaded by an endpoint cybersecurity agent 36 hosted by a client device 38. Each time that the endpoint cybersecurity agent 36 detects a change to the computer file 32, the endpoint cybersecurity agent 36 captures a copy or snapshot of the entire byte file content 34 associated with the computer file 32. The endpoint cybersecurity agent 36 adds, appends, or associates a date/time stamp 40 to the file content 34 associated with the computer file 32. The endpoint cybersecurity agent 36 then interfaces and/or cooperates with an operating system 42 to cause the client device 38 to upload the file content 34 to the cloud-based file integrity monitoring (or FIM) service 20. The endpoint cybersecurity agent 36, for example, sends the file content 34 to a network address (e.g., IP address) associated with the cloud computing environment 24. The file content 34 alerts or notifies the cloud computing environment 24 that the endpoint cybersecurity agent 36 has detected a change to the computer file 32. When the cloud computing environment 24 receives the file content 34, the cloud computing environment 24 stores and logs the current file content 34 (perhaps in association with the date/time stamp 40). So, when the client device 38 makes a change to the computer file 32, the endpoint cybersecurity agent 36 captures and uploads each version of the file content 34 to the cloud computing environment 24 for remote storage and for remote analysis.

FIG. 2 illustrates another example of the cloud-based file integrity monitoring (or FIM) service 20. While one or more of the networked members 28 of the cloud computing environment 24 may provide the FIM service 20, for simplicity, FIG. 2 again illustrates the server 26. The cloud computing environment 24 receives each file content 34 sent by the endpoint cybersecurity agent 36. While the endpoint cybersecurity agent 36 may upload many different file contents 34 as the computer file 32 changes over time, FIG. 2 only illustrates a simple example of two (2) different file contents 34*a* and 34*b*. The cloud computing environment 24 may then route, forward, or send the different file contents 34*a-b* to the server 26 for analysis. The server 26 may thus provide at least a portion of the FIM service 20 on behalf of a service provider 50. The FIM service 20, for example, determines a content difference 52 between two (or more) of the different file contents 34*a-b*. That is, when two (2) or more different copies or snapshots of the computer file 32 have different or unequal byte file contents 34, then the server 26 determines that the computer file 32 has undergone the content change 30. The FIM service 20, in plain words, determines that the computer file 32 has changed, and the change could represent a cybersecurity risk 54. As another simple example, the FIM service 20 may be configured to compare hash values that correspond to the different file contents 34*a-b*(perhaps using a hashing algorithm). If the hash values are unequal, then the FIM service 20 may determine that the computer file 32 has undergone the content change 30. The server 26 may thus be programmed to generate and send alert messages that warn of the content change 30 associated with the computer file 32. Other systems and personnel may further investigate the content change 30 to the computer file 32.

FIG. 3 illustrates more examples of the cloud-based file integrity monitoring (or FIM) service 20. The server 26 may compare the different file contents 34. The server 26, for example, has at least one hardware processor 60 (illustrated as "CPU/GPU") that executes an FIM application 62 stored in a memory device 64. The server 26 also has network interfaces (illustrated as "NI") 66 to multiple communications networks (such as the cloud computing environment 24 illustrated in FIGS. 1-2), thus allowing bi-directional communications with networked devices. The FIM application 62 instructs or causes the server 26 to perform operations, such as retrieving two (2) or more of the different file contents 34*a-b* (associated with the computer file 32) that were uploaded by the endpoint cybersecurity agent 36 and remotely stored by the cloud computing environment 24. When the server 26 receives the different file contents 34*a-b*, the FIM application 62 instructs or causes the server 26 to perform other operations, such as determining the content change 30 to the computer file 32. That is, when the FIM application 62 determines the content difference 52 between the different file contents 34, then the FIM application 62 determines the content change 30 to the computer file 32. As a simple example, the FIM application 62 may determine a hash value that corresponds to each file content 34*a-b*by hashing each file content 34*a-b* using a hashing algorithm. The FIM application 62 may then compare the hash values. If the hash values are equal, then the file contents 34*a-b*are equal/same and no content difference 52 exists. If the hash values differ, then the unequal hash values imply that the file contents 34*a-b* are unequal and that the content difference 52 exists. When the hash values are unequal, then the FIM service 20 may determine that the computer file 32 has undergone the content change 30.

Figure 4:
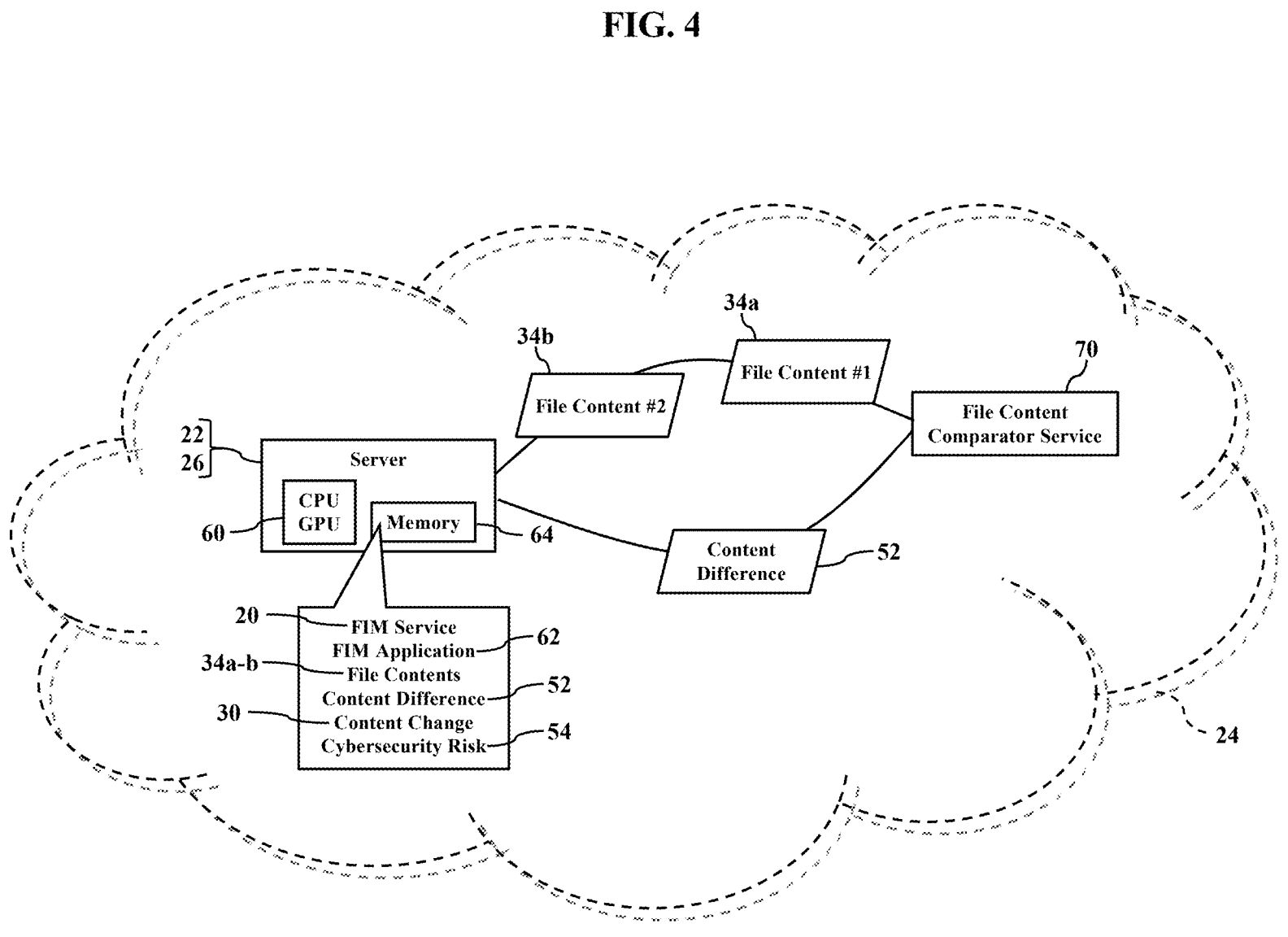

FIG. 4 illustrates more examples of the cloud-based file integrity monitoring (or FIM) service 20. Here the server 26 may utilize intra-cloud services to determine the content difference 52 between the different file contents 34. The FIM application 62, for example, may instruct or cause the server 26 to call a file content comparator service 70 offered by, or affiliated with, the cloud computing environment 24. The file content comparator service 70 compares the byte content associated with the different file contents 34*a-b*. The server 26 may outsource and send the different file contents 34*a-b* to the file content comparator service 70 (perhaps hosted by one or more of the network members 28 illustrated in FIGS. 1-2). The file content comparator service 70 receives the different file contents 34*a-b* as inputs and generates the content difference 52 as an output. The server 26 may thus outsource the different file contents 34 to the file content comparator service 70 and await a service response (e.g., the content difference 52). The file content comparator service 70 may thus use a sanctioned, approved, or authorized scheme, technique, algorithm, and/or mechanism to compare the different file contents 34*a-b* and to determine the content difference 52 between the different file contents 34*a-b*. The file content comparator service 70 may thus send the content difference 52 to the network address (e.g., IP address) associated with the server 26. When the server 26 receives the content difference 52, the FIM application 62 instructs or causes the server 26 to determine the content change 30, based on the content difference 52. The content difference 52, for example, may be merely a binary true/false or 1/0 value. If the file contents 34 match or are equal, for example, then perhaps the content difference has a bit 1 or true value indicating equality. The server 26 may thus determine that there is no/null/zero content change 30, so the computer file 32 has static byte content. If, however, the content difference 52 has a bit 0 or false value indicating inequality, then the server 26 may determine that there is the content change 30, so the computer file 32 has changed over time between the different file contents 34*a-b*.

Figure 5:
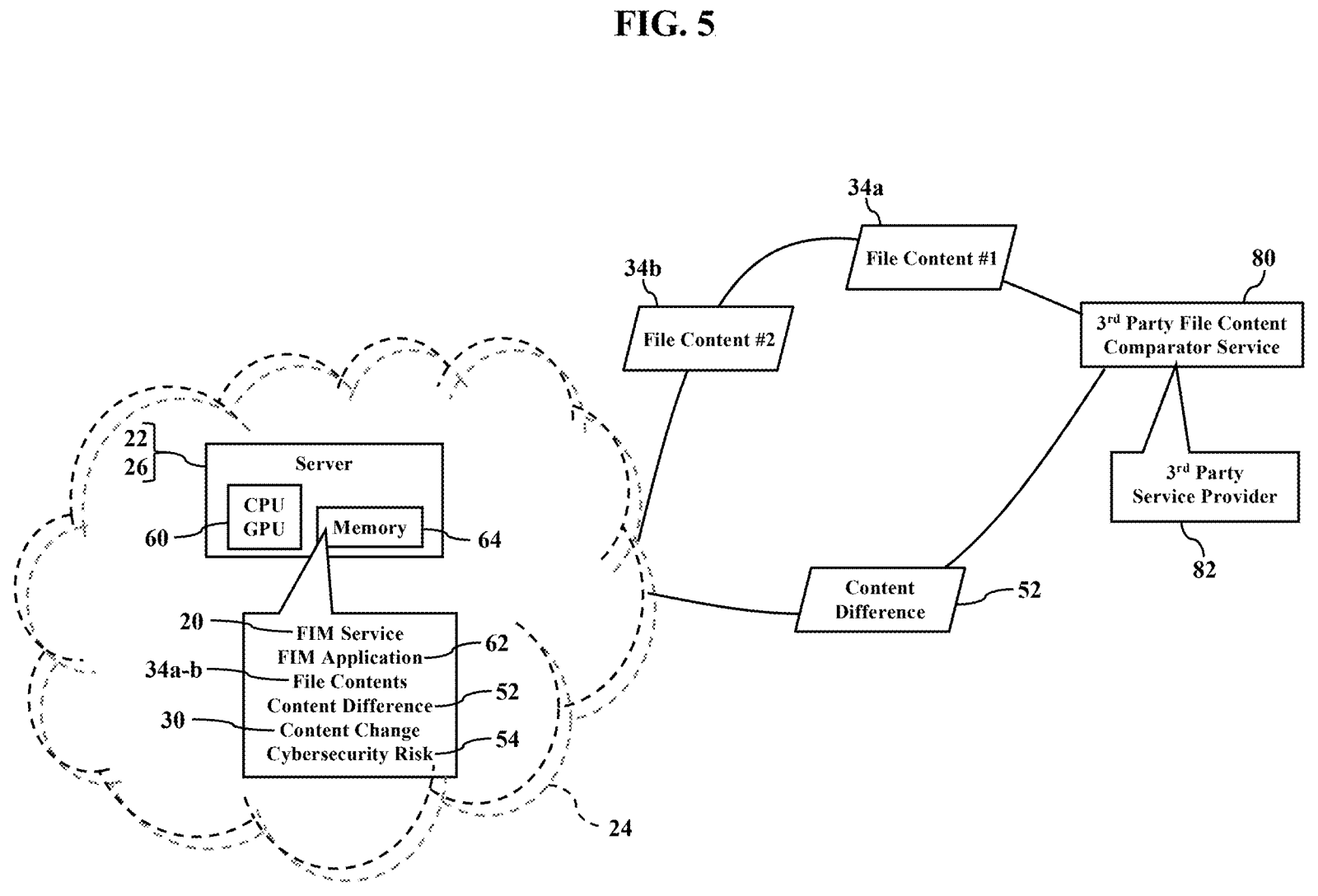

FIG. 5 illustrates more examples of outsourcing. Here the server 26 may utilize inter-cloud services to determine the content difference 52 between the different file contents 34.

The file integrity monitoring (or FIM) application 62, for example, may instruct or cause the server 26 to call a third-party file content comparator service 80 offered by, or affiliated with, a third party service provider 82. The third-party file content comparator service 80, for example, may specialize in differentiation services to clients (such as the server 26 and/or the cloud computing environment 24). The server 26, as an example, may send the different file contents 34*a-b* to the network or IP address associated with the third-party file content comparator service 80. The third-party file content comparator service 80 receives the different file contents 34*a-b* as inputs and generates the content difference 52 as an output. The server 26 may thus outsource the different file contents 34*a*-N to the third-party file content comparator service 80 and await a service response (e.g., the content difference 52). The third-party file content comparator service 80 uses whatever scheme, technique, algorithm, and/or mechanism to compare the different file contents 34*a-b* and to determine the content difference 52 between the different file contents 34*a-b*. The third-party file content comparator service 80 may thus send the content difference 52 to the network address (e.g., IP address) associated with the server 26. When the server 26 receives the content difference 52, the FIM application 62 instructs or causes the server 26 to determine the content change 30, based on the content difference 52 determined by, or generated by, the third-party file content comparator service 80. The content difference 52, again for example, may merely be a binary true/false or 1/0 value. The content difference 52, in simple words, indicates whether the file contents 34*a-b* match, equal, or differ. The server 26 may thus determine the content change 30, based on the content difference 52.

FIG. 6 illustrates examples of web interfacing and client updating. Once the server 26 identifies the content difference 52 (such as via self-determination or inter/intra-cloud outsourcing), the server 26 may notify the client device 38. The file integrity monitoring (or FIM) application 62, for example, may instruct or cause the server 26 to send the content difference 52, and/or the content change 30, via the cloud computing environment 24 and other communications networks (such as an access network 90) to the network/IP address associated with the client device 38. When the client device 38 receives the content difference 52 and/or the content change 30, the client device 38 may present the content difference 52 and/or the content change 30 to a user 92. The FIM service 20 may have a user/web interface that allows user interaction and feedback. FIG. 6, for example, illustrates remote access to the FIM service 20. The human user 92, for example, may use the client device 38 to interface with the server 26. FIG. 6 also illustrates the client device 38 as a remote laptop computer 94, but the client device 38 may be a smartphone, tablet, server, or other computer system. The client device 38 has a network interface to the access network 90 or other communications network (such as the public Internet), thus allowing the client device 38 to establish network communications with the cloud computing environment 24 and/or with the server 26. The client device 38 may thus have access permissions to the cloud computing environment 24 and/or to the server 26. The client device 38 has a hardware processor 96 that executes the endpoint cybersecurity agent 36 stored in a memory device 98. The FIM application 62 and the endpoint cybersecurity agent 36 may cooperate in a client-server relationship to facilitate a human review of the content difference 52 and/or the content change 30 determined by the FIM service 20.

FIG. 6 also illustrates simple examples of web interfacing. The client device 38 may also store and execute a web browser 100 that interfaces with the operating system 42 and/or with the endpoint cybersecurity agent 36. When the human user 92 wishes to request or to review the FIM service 20, the human user 92 may command the endpoint cybersecurity agent 36 to establish communication with the server 26. The human user 92, in particular, may request that the FIM service 20 determine the content difference 52 and/or the content change 30 between two (2) or more of the file contents (such as 34*a* and 34*b*). The web browser 100 and/or the endpoint cybersecurity agent 36 cooperate with the operating system 42 to request and to receive a webpage 102 having content representing the content difference 52 and/or the content change 30. The client device 38 processes and displays the webpage 102 as a dashboard or other graphical user interface (GUI) 104 via a display device 106. The human user 92 may thus scrutinize the content difference 52 and/or the content change 30 determined by the FIM service 20. The human user 92, as an example, may approve or override the content difference 52 and/or the content change 30.

Figure 7:
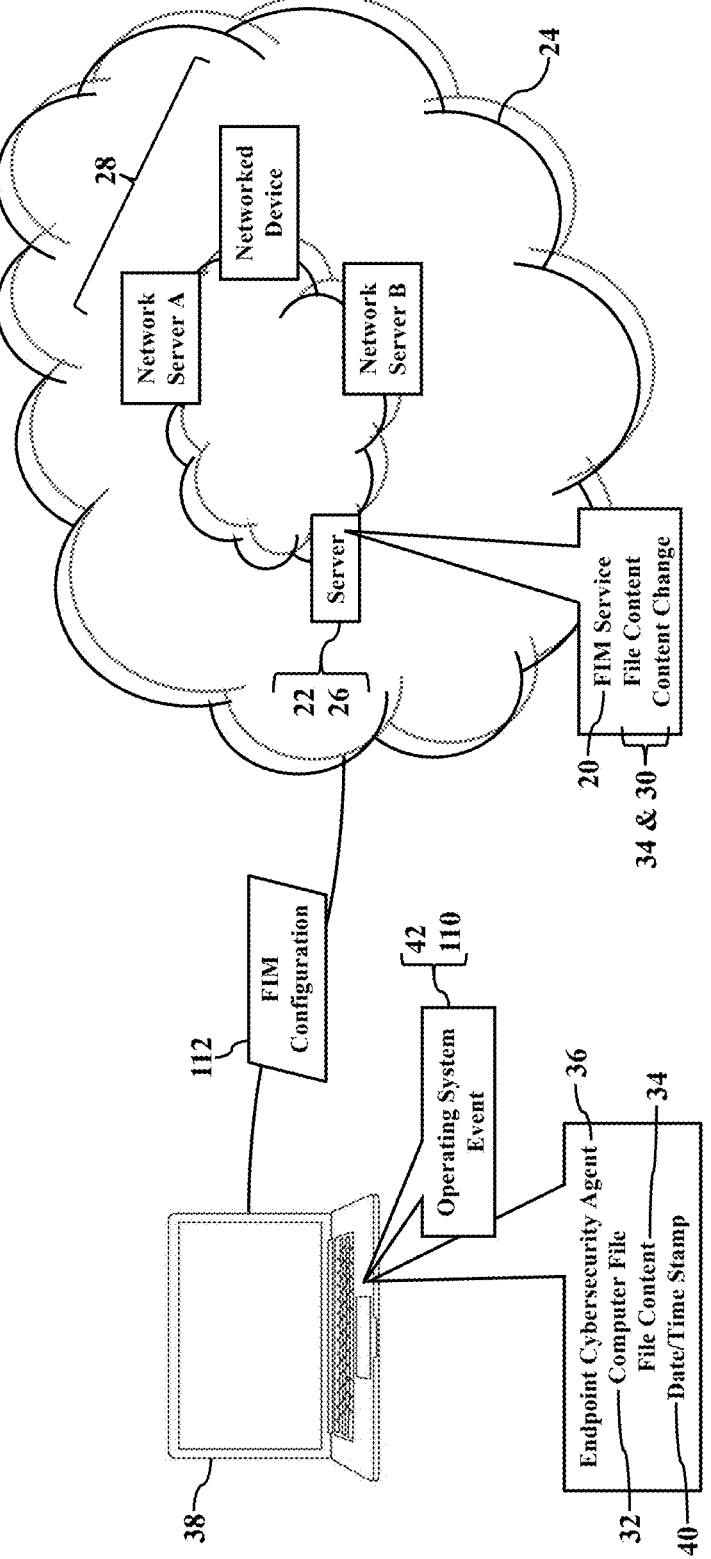
FIG. 7 illustrates examples of client provisioning.

FIG. 7 illustrates examples of client provisioning. The file integrity monitoring (or FIM) service 20 may instruct the client device 38 to capture and upload the different file contents 34, in response to each corresponding operating system event 110. The FIM service 20, for example, may send an FIM configuration 112 to the network/IP address associated with the client device 38 hosting the endpoint cybersecurity agent 36. The FIM configuration 112 may originate from the server 26, or the FIM configuration 112 may be sent from another networked member 28 of the cloud computing environment 24. The FIM application 62, for example, instructs or causes the server 26 to retrieve and to send the FIM configuration 112 to the client device 38. When the client device 38 receives the FIM configuration 112, the endpoint cybersecurity agent 36 cooperates with the operating system 42 to install the FIM configuration 112. The FIM configuration 112, for example, adds programming code or instructions that enhance the services provided by the endpoint cybersecurity agent 36. The FIM configuration 112, for example, provisions and configures the endpoint cybersecurity agent 36 to establish event notifications from the operating system 42 in response to read/write/access and other operating system events 110 associated with the computer file 32. The FIM configuration 112, as another example, provisions and configures the endpoint cybersecurity agent 36 to read, copy, timestamp 40, and temporarily store the current file content 34 associated with the computer file 32. The FIM configuration 112 may also provision and configure the endpoint cybersecurity agent 36 to send/upload the current file content 34 to the network/IP address associated with the FIM service 20. The FIM configuration 112 thus causes the endpoint cybersecurity agent 36 to detect read/write/access and other predetermined operating system events 110 that may precede or indicate a change to the computer file 32. The FIM configuration 112 also causes the endpoint cybersecurity agent 36 to capture and report, in real time or near real time, a current snapshot of the file content 34 representing the computer file 32. So, as the host client device 38 changes the computer file 32 in response to each operating system event 110, the endpoint cybersecurity agent 36 uploads timestamped snapshots of the file content 34 to the cloud-based file integrity monitoring service 20.

Figure 8:
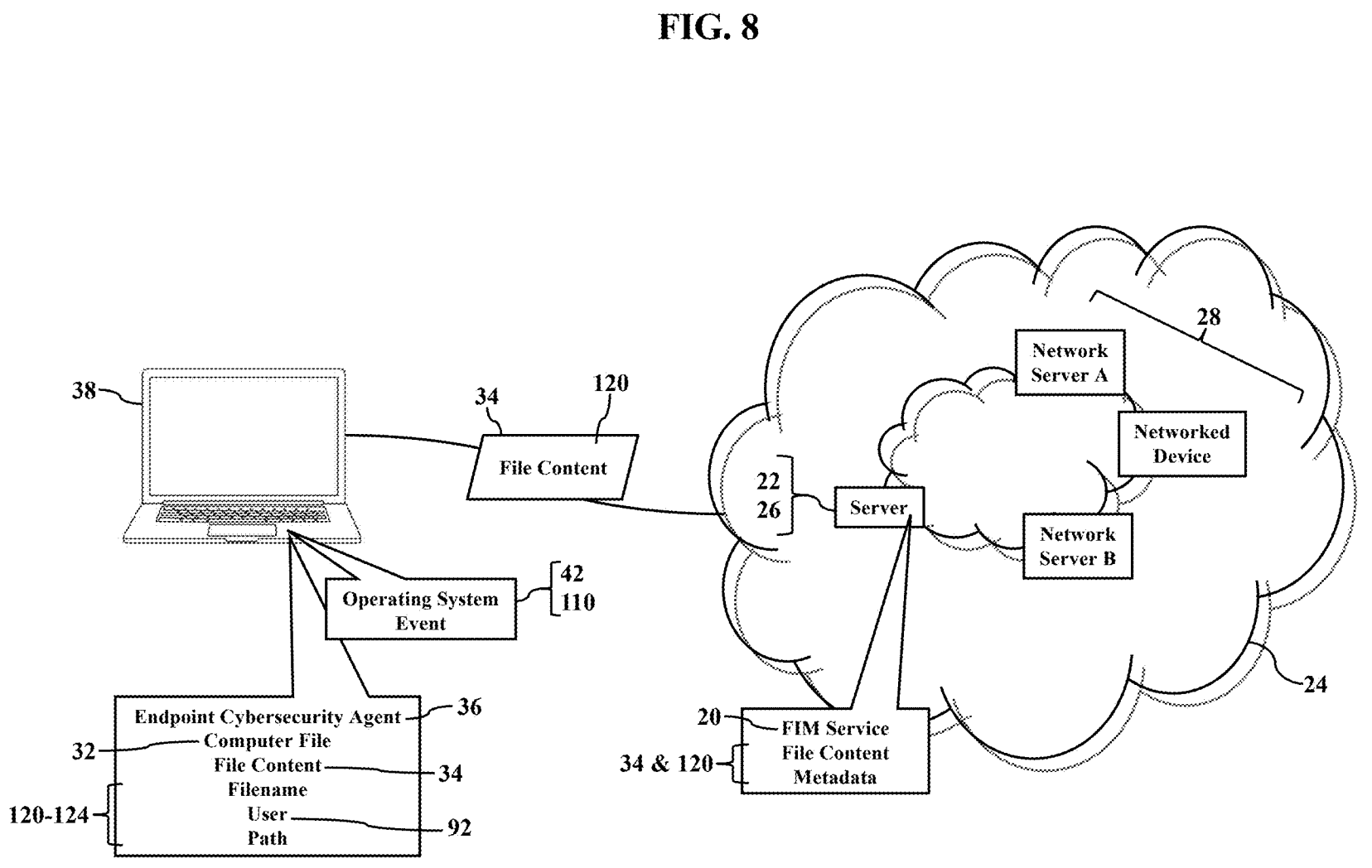

FIG. 8 illustrates more examples of the file integrity monitoring (or FIM) service 20. Because the endpoint cybersecurity agent 36 detects read/write/access and other predetermined operating system events 110, the endpoint cybersecurity agent 36 may add or augment each file content 34 with metadata 120 describing the event. The metadata 120, for example, may identify the filename 122 associated with the computer file 32 and the current file content 34, perhaps as described by the event notification from the operating system 42. The metadata 120, as another example, may identify the user 92 (e.g., user identifier) associated with the client device 38, perhaps as described by the event notification from the operating system 42. The metadata 120, as yet another example, may identify the file system path 124 associated with the computer file 32, as described by the event notification from the operating system 42. When the endpoint cybersecurity agent 36 reports/uploads the file content 34, the endpoint cybersecurity agent 36 may add, append, or report the metadata 120 to the FIM service 20. When the cloud computing environment 24 receives the file content 34, the cloud computing environment 24 may store and log the accompanying metadata 120. The server 26, for example, may retrieve and read the metadata 120, thus allowing the FIM application 62 to determine the filename 122 associated with the computer file 32, the user 92 associated with the hosting client device 38, and/or the file system path 124 associated with the computer file 32.

Figure 9:
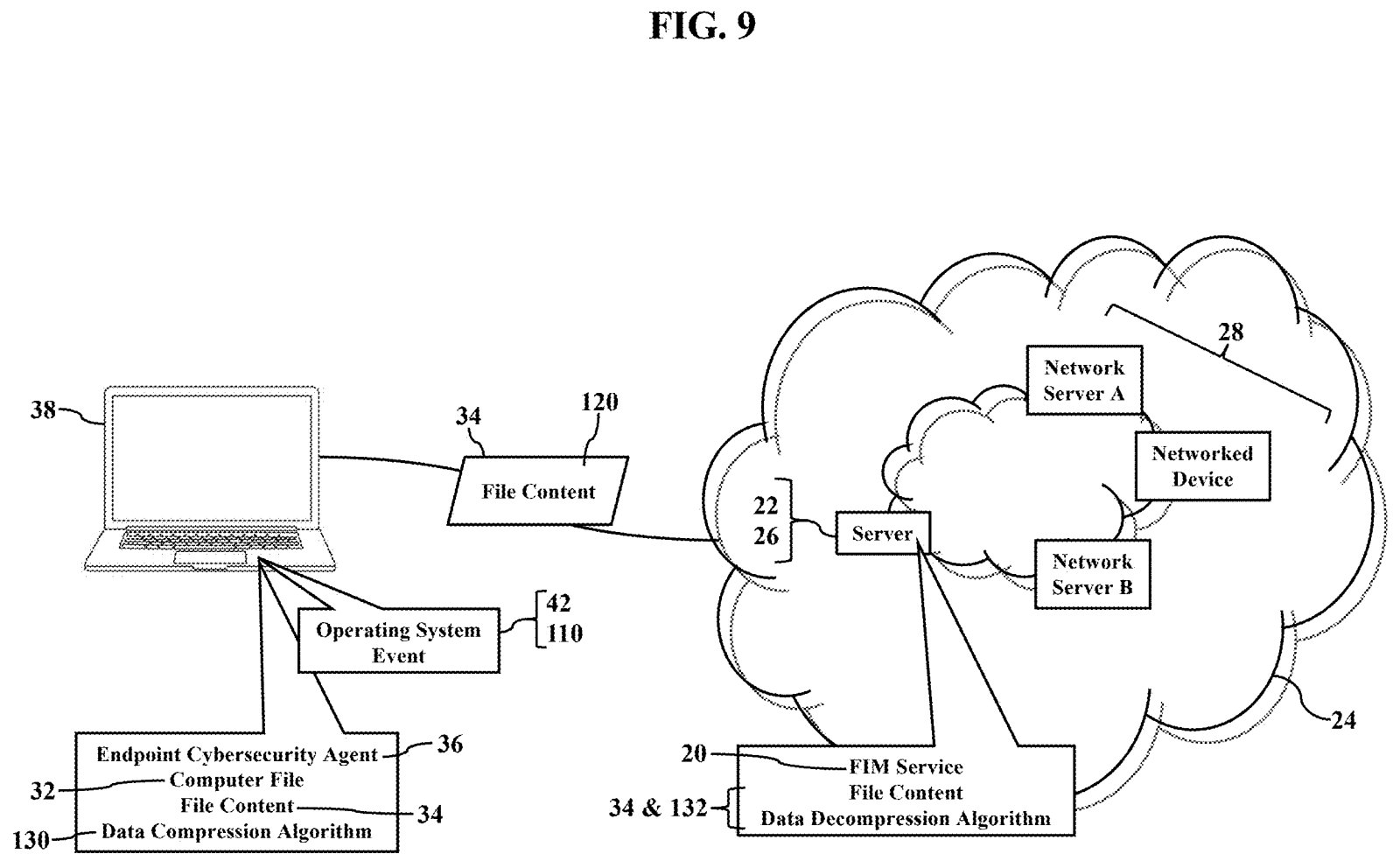
Figure 10:
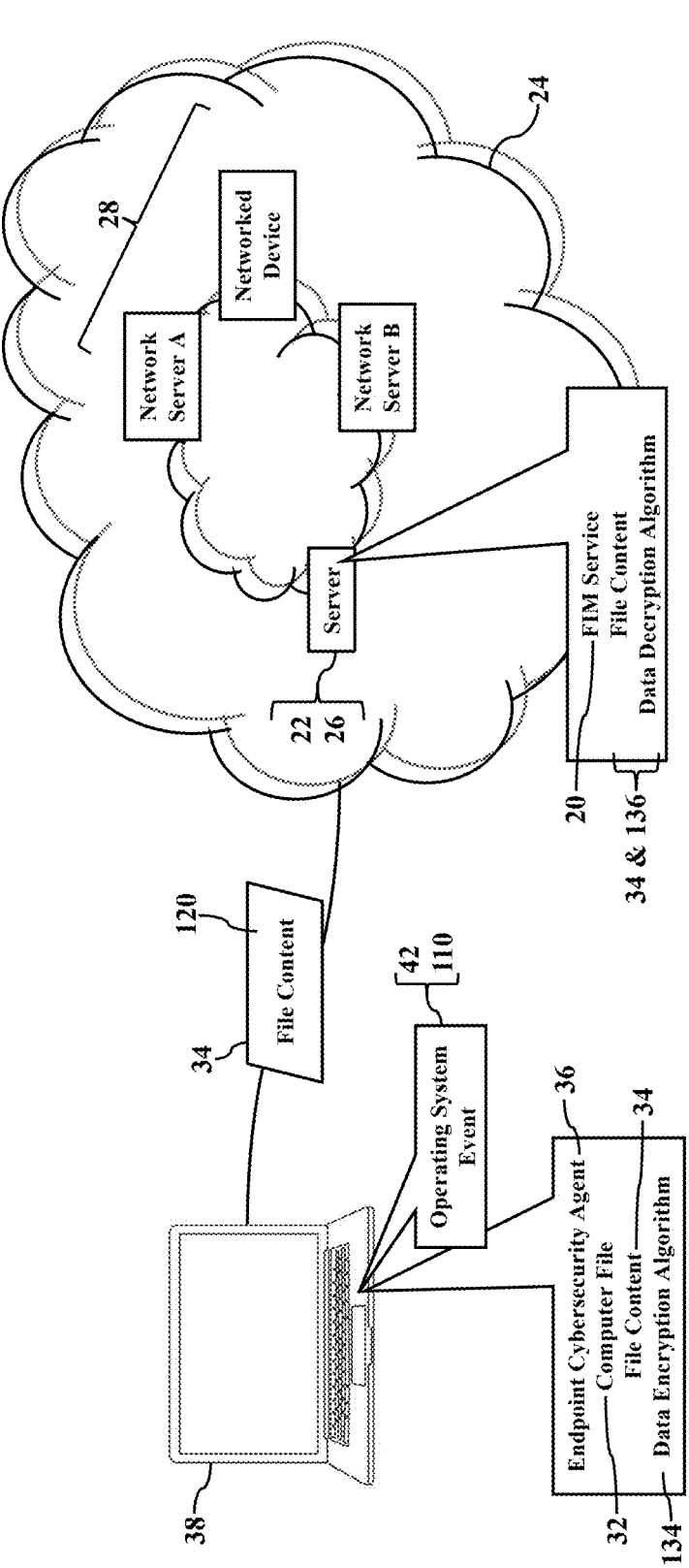

FIGS. 9-10 illustrate examples of data manipulation. FIG. 9, for example, illustrates data compression and decompression. When the endpoint cybersecurity agent 36 generates the electronic copy snapshot of the current file content 34 associated with the computer file 32 (perhaps in response to the operating system event 110), the endpoint cybersecurity agent 36 may use a data compression algorithm 130 to generate a compressed version of the file content 34. The endpoint cybersecurity agent 36 may then send/upload the compressed version of the file content 34 to the network/IP address associated with the FIM service 20. When the cloud computing environment 24 receives the compressed version of the file content 34, the cloud computing environment 24 (such as the server 26) may call, apply, or utilize a data decompression algorithm 132 to decompress and to recover the original file content 34. The cloud computing environment 24 may similarly decompress the metadata 120 (if compressed). The cloud computing environment 24 may then store and log the file content 34 and the metadata 120. The cloud computing environment 24, however, may alternatively store and log the compressed version of the file content 34. When the server 26 retrieves the compressed version of the file content 34, then the file integrity monitoring (or FIM) application 62 may call, apply, or utilize the appropriate data decompression algorithm 132 to decompress and to recover the original file content 34 and/or the metadata 120.

FIG. 10 illustrates examples of data encryption and decryption. When the endpoint cybersecurity agent 36 generates the electronic copy snapshot of the current file content 34 associated with the computer file 32 (in response to the operating system event 110), the endpoint cybersecurity agent 36 may use a data encryption algorithm 134 to generate an encrypted version of the file content 34. The endpoint cybersecurity agent 36 may then send/upload the encrypted version of the file content 34 to the network/IP address associated with the file integrity monitoring (or FIM) service 20. When the cloud computing environment 24 receives the encrypted version of the file content 34, the cloud computing environment 24 (such as the server 26) may call, apply, or utilize a data decryption algorithm 136 to decrypt and to recover the original file content 34. The cloud computing environment 24 may similarly decrypt the metadata 120 (if encrypted). The cloud computing environment 24 may then store and log the file content 34 and the metadata 120. The cloud computing environment 24, however, may alternatively store and log the encrypted version of the file content 34. When the server 26 retrieves the encrypted version of the file content 34, then FIM application 62 may call, apply, or utilize the appropriate data decryption algorithm 136 to decrypt and to recover the original file content 34 and/or the metadata 120.

FIG. 11 illustrates examples of request and response mechanisms. The client device 38 may request the file integrity monitoring (or FIM) service 20 from the cloud computing environment 24. The endpoint cybersecurity agent 36 may, for example, autonomously request that the cloud computing environment 24 determine, or calculate, the content difference 52 between two (2) or more file contents 34. The endpoint cybersecurity agent 36, as another example, may request the content difference 52 in response to hardware, software, and/or operating system event 110 associated with the computer file 32. The endpoint cybersecurity agent 36, as yet another example, may execute logical rules that randomly or periodically request the content difference 52 (perhaps, for example, in response to a time/date schedule). The user 92 of the client device 38, as still more examples, may command or request that the endpoint cybersecurity agent 36 request the content difference 52 (perhaps, for example, in response to the user's selection of a graphical control displayed via the GUI 104 and/or the webpage 102, as explained with reference to FIG. 6). Whatever the request mechanism, the endpoint cybersecurity agent 36 may request the FIM service 20.

FIG. 11, for example, illustrates an FIM request 140. Whenever a portion of the FIM service 20 is needed, the endpoint cybersecurity agent 36 may generate and send the FIM request 140 to the FIM service 20. The FIM request 140, for example, requests that the FIM service 20 determine the content difference 52 between two (2) or more file contents 34. The FIM request 140, for example, may specify the computer file 32 (such as the filename 122 or other identifier). The FIM request 140, as another example, may specify or identify the two (2) or more file contents 34 to be analyzed. Each file content 34, for example, may have a corresponding unique file content identifier 142. The FIM request 140, as more examples, may specify the date/time stamps 40 associated with the two (2) or more file contents 34. The FIM request 140, as another example, may specify a timeframe 144 of interest (such as minutes, hours, or longer). The FIM request 140, as still more examples, may identify the client device 38 (such as a device identifier) and/or the user 92 (such as a user identifier). The FIM request 140 may be generated to contain, reference, or link service parameters and/or other content that the FIM service 20 specifies as service requirements or service fulfillment. The endpoint cybersecurity agent 36 may generate and send the FIM request 140 via the cloud computing environment 24 to the network/IP address associated with the FIM service 20.

The FIM service 20 may be provided. When the cloud computing environment 24 receives the FIM request 140, the cloud computing environment 24 may provide the FIM service 20. The cloud computing environment 24, for example, may route the FIM request 140 to the server 26. When the server 26 receives the FIM request 140, the FIM application 62 instructs or causes the server 26 to inspect the FIM request 140 and to read/retrieve the service parameters. The FIM application 62, as more examples, may obtain the filename 122, the file content identifier(s) 144, the date and timestamp(s) 40, the timeframe 144 of interest, and/or unique identifiers associated with the client device 38 and/or with the user 92. The FIM application 62 may then instruct or cause the server 26 to determine the content difference 52 between the two (2) or more file contents 34 associated with, or reference by, the FIM request 140. The FIM application 62, for example, may compare the different file contents 34 and calculate the content difference 52. The FIM application 62, as another example, may outsource the different file contents 34 and receive the content difference 52 as a service response (as above explained with reference to FIGS. 4-5). However the FIM application 62 determines the content difference 52, the FIM application 62 may then determine the content change 30 as an FIM service 20 response, perhaps based on the different file contents 34 and/or the content difference 52. The FIM application 62 may then instruct or cause the server 26 to send the content difference 52 and/or the content change 30 to the client device 38 and/or the endpoint cybersecurity agent 36. The endpoint cybersecurity agent 36 and the operating system 42 may thus cooperate to cause the client device 38 to output the content difference 52 and/or the content change 30 (such as display via the GUI 104). The user 92 may thus be visually/audibly notified of whether the locally-stored computer file 32 has changed.

Figure 12:
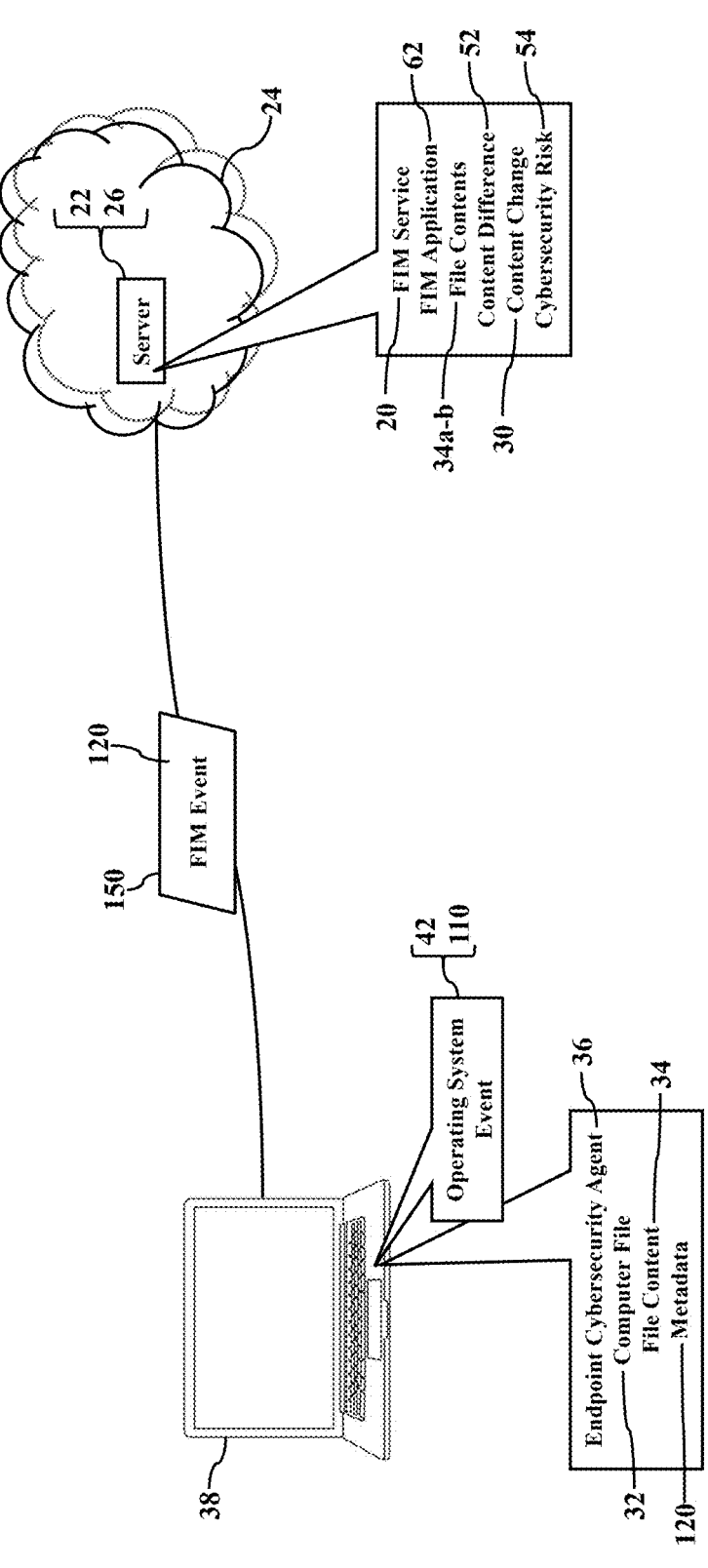
FIG. 12 illustrates examples of FIM event processing.

FIG. 12 illustrates examples of file integrity monitoring (or FIM) event processing. The endpoint cybersecurity agent 36 monitors its host client device 38 for read/write and other operating system events 110 associated with the computer file 32. When the endpoint cybersecurity agent 36 detects each operating system event 110 (perhaps in response to event notifications from the operating system 42), the endpoint cybersecurity agent 36 generates the real time or near real time snapshot of the current file content 34 representing the computer file 32. The endpoint cybersecurity agent 36 may also generate an FIM event 150. The FIM event 150, however, is affiliated with the FIM service 20 and not affiliated with, or generated by, the operating system 42. The FIM event 150 may be generated by the endpoint cybersecurity agent 36 to report each file content 34 captured in response to the corresponding operating system event 110. The endpoint cybersecurity agent 36 may create the FIM event 150 with the full, compressed, and/or encrypted current file content 34 representing the computer file 32 (as explained with reference to FIGS. 9-10). The FIM event 150 may also specify the metadata 120 (such as the filename 122, the unique file content identifier 142, and/or the date/timestamp 40, as illustrated by FIG. 11). The FIM event 150 may specify or identify the client device 38 and/or the user 92 of the client device 38 (as also illustrated by FIG. 11). The endpoint cybersecurity agent 36 may create the FIM event 150 to contain, reference, or link whatever content or parameters that the FIM service 20 specifies. The endpoint cybersecurity agent 36 may generate and send the FIM event 150 via the cloud computing environment 24 to the network/IP address associated with the FIM service 20.

The cloud-based file integrity monitoring (FIM) service 20 thus identifies the content change(s) 30 to the computer file 32. As the endpoint cybersecurity agent monitors its host client device 38 for the read/write and other operating system events 110 associated with the computer file 32, the endpoint cybersecurity agent may generate and report each corresponding FIM event 150 to the FIM service 20. So, as the host client device 38 changes the computer file 32 (in response to each operating system event 110), the endpoint cybersecurity agent 36 sequentially and serially uploads each FIM event 150 containing or referencing each corresponding file content 34. The cloud-based FIM service 20 stores and logs each FIM event 150, thus logging a content change history for the computer file 32. The cloud-based FIM service may thus retrieve, read, and analyze different FIM events 110, and their corresponding snapshots or file contents 34, to quickly reveal who changed the computer file 32 and how its file content 34 changed over time.

Figure 13:
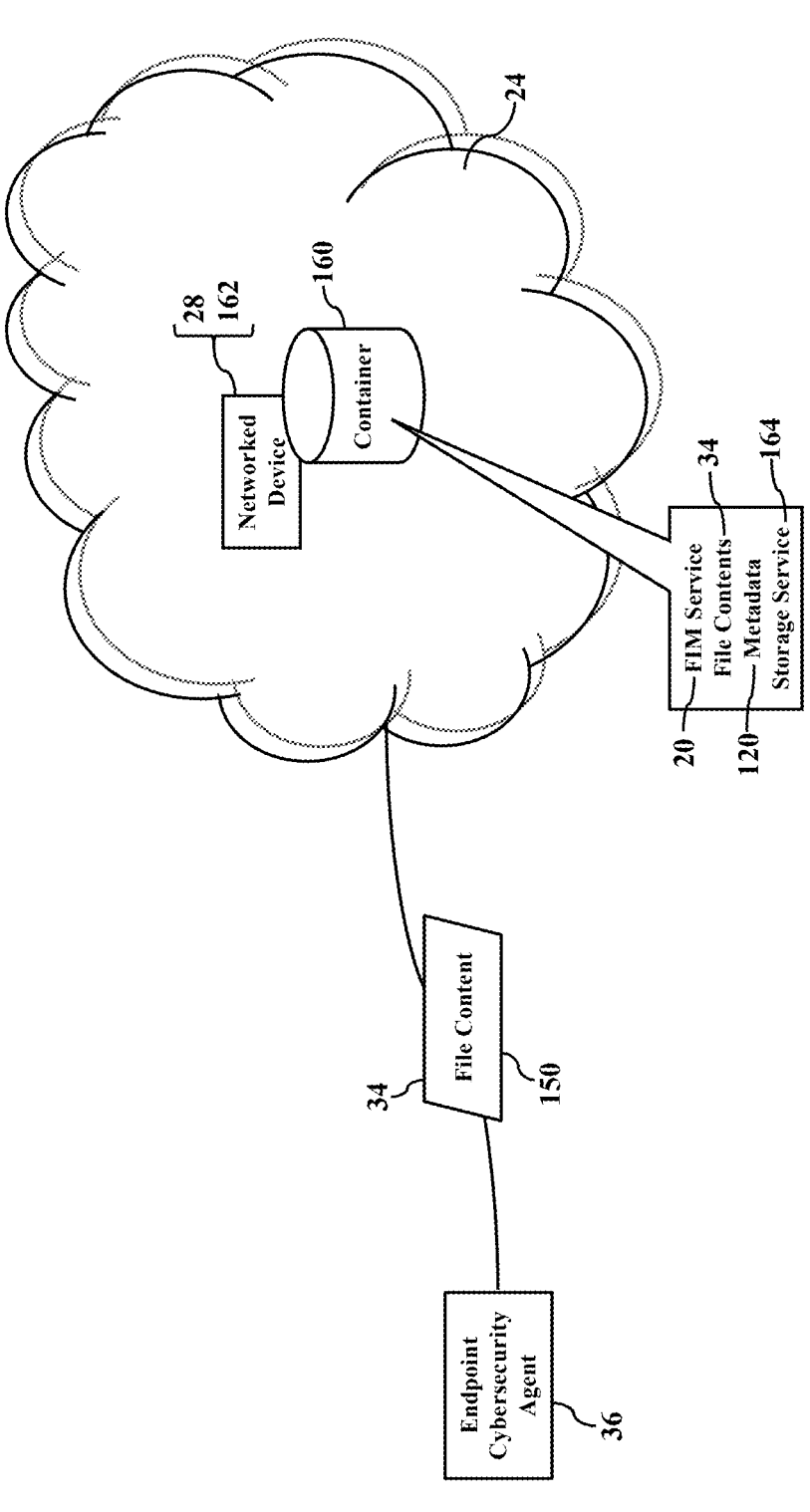

FIGS. 13-16 illustrate examples of cloud storage. When the cloud computing environment 24 receives the file content 34 captured by the endpoint cybersecurity agent 36, the cloud computing environment 24 stores the file content 34. FIG. 13, for example, illustrates a cloud-based isolated container 160 that stores the difference file contents 34 reported by the endpoint cybersecurity agent 36. The cloud computing environment 24 may thus establish and configure one or more cloud containers 160 that is/are affiliated with the FIM service 20. The FIM service 20 may thus interface with applications and servers (such as the networked members 28 of the cloud computing environment 24 and/or virtual machines 162) that establish a cloud-native storage service 164 for the difference file contents 34. The container 160 may be stored and maintained in a memory device of the networked member 28 affiliated with the cloud computing environment 24. The container 160 may thus contain all of the necessary software elements to provide the cloud-native storage service 164 of the difference file contents 34 reported by the endpoint cybersecurity agent 36. The FIM service 20 may thus implement a containerized storage service 160 and 164 for storing and/or logging the difference file contents 34 reported by the endpoint cybersecurity agent 36. As a simple example, suppose that the storage service 164 runs as the container 160 in the distributed AMAZON® Web Services platform. The electronic data representing the difference file contents 34 may be stored in an AMAZON SIMPLE STORAGE SERVICE® (or "AMAZON S3®") storage container bucket. The S3® storage container bucket, for example, may be dedicated to the FIM service 20. That is, all file contents 34 reported by all endpoint cybersecurity agent 36 may be stored to the single S3® storage container bucket. The S3® storage container bucket, however, may be overwhelmed in bytes, especially for many endpoint cybersecurity agents 36 operating in the field. The S3® storage container bucket, as another example, may thus be dedicated to only a grouping of endpoint cybersecurity agents 36, thus limiting the amount of data associated with a single container 160. Whatever the architecture, the difference file contents 34 reported by the endpoint cybersecurity agent 36 may be stored to, and associated with, the container 160. So, whether the endpoint cybersecurity agent 36 sends the latest/current file content 34 and/or the FIM event 150, the networked members 28 of the cloud computing environment 24 may route the file content 34 and/or the FIM event 150 to the network/IP address associated with the containerized storage service 160 and 164. The FIM service 20 may engage the containerized storage service 160 and 164 to store and log the current file content 34 (perhaps in association with the metadata 120).

Figure 14:
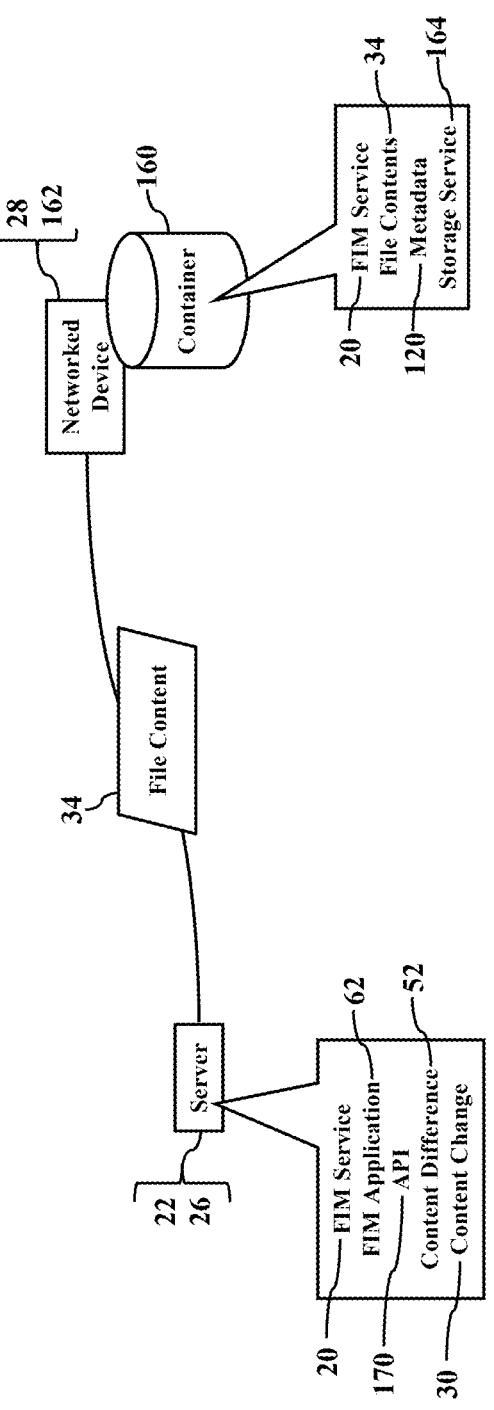

As FIG. 14 illustrates, the FIM service 20 may retrieve a desired file content 34. The FIM application 62, for example, may cause or instruct the server 26 to query the containerized storage service 160 and 164 (perhaps using an application programming interface (or API) 170). Because the FIM service 20 may store and log the different file contents 34, the server 26, for example, may specify the metadata 120 (such as the date/time stamp 40 and/or the unique file content identifier 142) as a query parameter. The FIM application 62 may program the server 26 to generate a query using the API 170 that identifies the desired query parameter(s). The FIM service 20 retrieves the file content(s) 34 from the containerized storage service 160 and 164 and routes the file content(s) 34 to the server 26. The FIM application 62 may cause or instruct the server 26 to determine the content change 30, and/or the difference 52, based on file content(s) 34.

Figure 15:
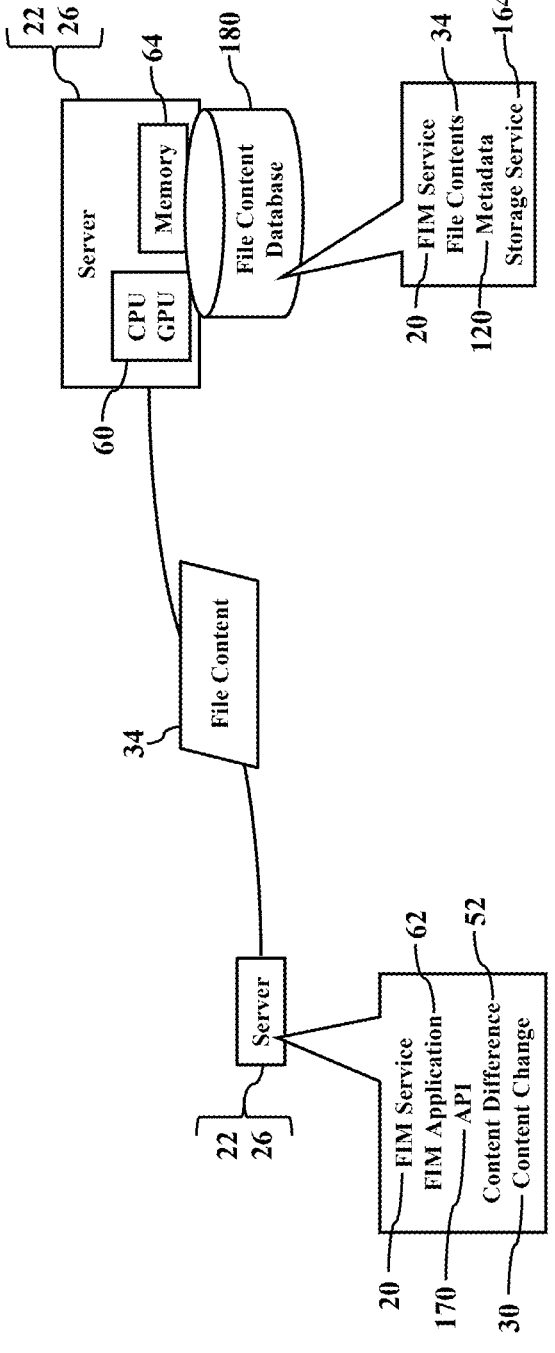

FIG. 15 illustrates more examples of cloud storage. When the cloud computing environment 24 receives the file content 34 captured by the endpoint cybersecurity agent 36, the cloud computing environment 24 stores the file content 34. FIG. 15 illustrates a cloud-based file content database 180 that stores the difference file contents 34 reported by the endpoint cybersecurity agent 36. Even though the file content database 180 may be remotely stored and maintained by the cloud computing environment 24, FIG. 14 illustrates a simple example of local server storage. The server 26 may thus store the file content database 180 in the memory device 64. The file content database 180 stores and logs electronic records representing each file content 34 reported by the endpoint cybersecurity agent 36.

As FIG. 16 illustrates, the FIM service 20 maintains a rich repository of historical file knowledge. As the cloud computing environment 24 receives and logs each file content 34, the cloud computing environment 24 may collect and store each file content 34 and its associated metadata 120 (such as the corresponding date/time stamp 40 and/or the corresponding file content identifier 142). For example, even though the container 160 and the file content database 180 may have a logical structure, a relational database structure is perhaps easiest to understand. FIG. 16 thus illustrates the container 160, and/or the file content database 180, as a table 182 having row and columnar database entries that map, relate, convert, or associate different file contents 34 to their corresponding metadata 120. As the many file contents 34 are routed to the cloud computing environment 24 and/or to the server 26, the FIM service 20 may add database entries that log each file content 34 to its corresponding metadata 120. So, when the FIM service 20 and/or the FIM application 62 determines the content change 30 to the computer file 32, the FIM service 20 and/or the FIM application 62 may query the file content database 180 for a query parameter (such as the date/time stamp 40 and/or the unique file content identifier 142) and identify and/or retrieve matching or similar historically-logged file contents 34. If a matching database entry is determined, then the FIM service 20 and/or the FIM application 62 may identify and/or retrieve a corresponding columnar/row entries.

Figure 17:
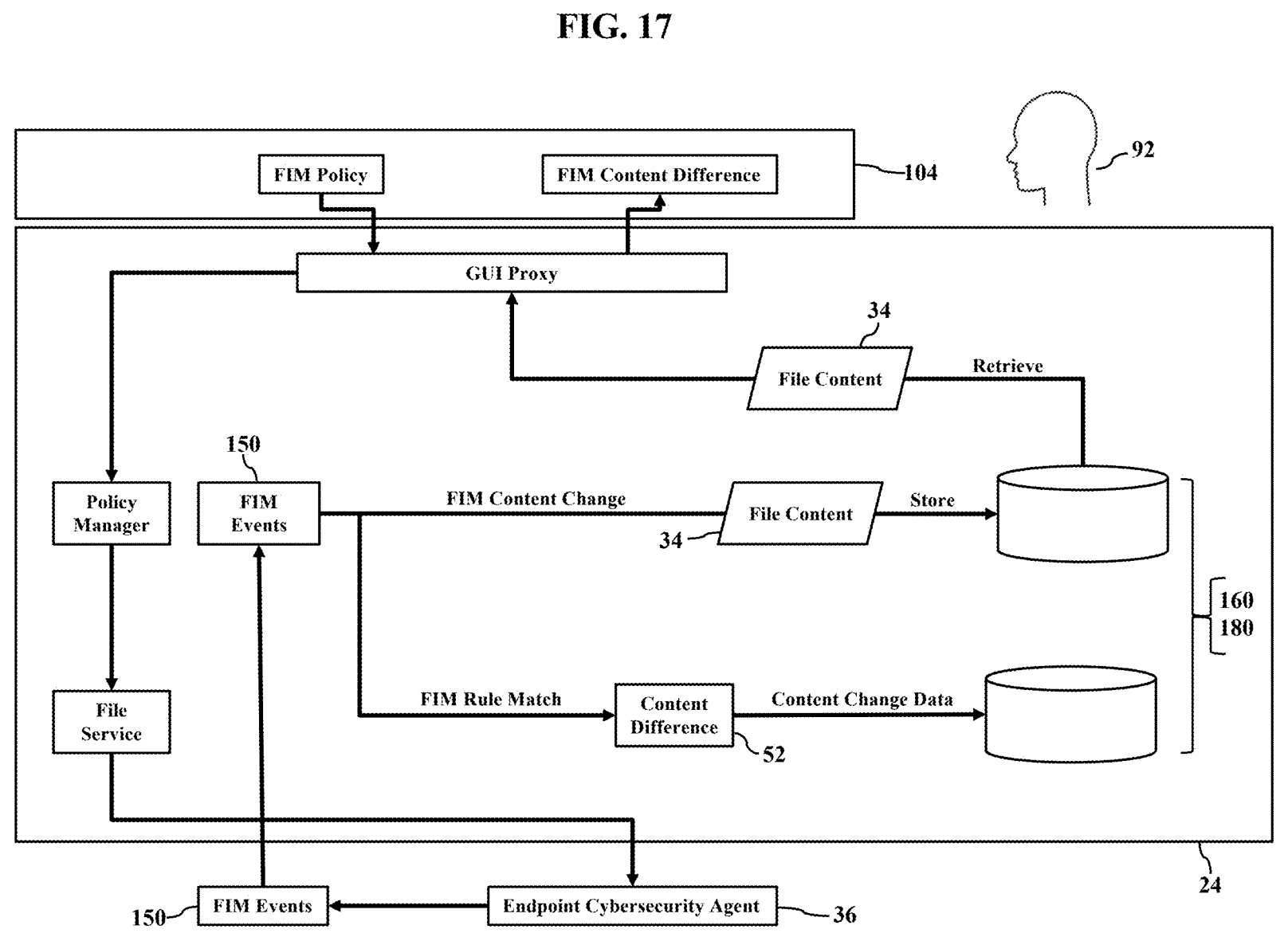

FIG. 17 illustrates more examples of architectural design. The FIM service 20 may send the FIM configuration 112 to the network/IP address associated with the client device 38 hosting the endpoint cybersecurity agent 36 (as explained with reference to FIG. 7). As a simple example, the user 92 of the client device 38 may make selections, type text, and other inputs to the GUI 104 displayed by the client device 38 (as explained with reference to FIG. 6). The user 92, as another example, may create, update, and/or assign FIM policies to the endpoint cybersecurity agents 36 designated as participants or subscribers to the FIM service 20. The FIM configuration 112 for capturing the file content changes 30 is sent to the endpoint cybersecurity agents 36. The FIM service 20, for example, may be a simple graphical selection that allows the user 92 to merely opt in to the FIM service 20. Moreover, the user 92 may additionally specify the computer file 32 (such as the filename 122) to be monitored by capturing and uploading/reporting the file contents 34 to the remote FIM service 20.

Once the endpoint cybersecurity agent 36 is configured, the endpoint cybersecurity agent 36 ingests the operating system events 110. The endpoint cybersecurity agent 36 uses the filesystem to listen for the operating system events 110. When the endpoint cybersecurity agent 36 receives an event notification of an event 110 (such as file open, write, read, or other), the endpoint cybersecurity agent 36 may check whether the computer file 32 matches the file path 124 configured in the policy rules. If the computer file 32 matches the file path 124, then the endpoint cybersecurity agent 36 may check if the filename 122 matches a filename that the user 92 has specified/configured for monitoring the file content changes 30 (assuming the rule contains such files). If a match exists, the endpoint cybersecurity agent 36 captures the byte snapshot of the current file content 34 and reports/clouds the current file content 34 (such as the FIM event 150) using a link to an event ontology definition. Moreover, in addition to uploading the current file content 34, the FIM event 150 may also include, link, or reference the metadata 120 (such as the path of the computer file 32, the data compression algorithm 130 used to compress the file content 34, and the unique file content identifier 142).

When the cloud computing environment 24 receives the file content 34, the cloud computing environment 24 may route the FIM event 150 (perhaps by agents on a dedicated topic) and consumed by the FIM service 20 (such as the server 26). The FIM service 20 extracts the file content 34 and the metadata 120 from a packet payload. The FIM service 20 stores the file content 34 (such as by the container 160 and/or by the file content database 180).

The endpoint cybersecurity agent 36 may report multiple, different file contents 34. Suppose, for example, that the endpoint cybersecurity agent 36 uploads multiple, serial/sequential write events to the computer file 32 (perhaps by multiple processes and/or by multiple different users). For every write event, for example, the endpoint cybersecurity agent 36 may send the corresponding FIM event 150 explaining, detailing, or referencing the matches (as above explained). Each FIM event 150, as more examples, may contain data fields describing the previous date/time stamp 40 and/or the previous unique file content identifier 142. Each FIM event 150, as still more examples, may contain data fields describing a current/new date/time stamp 40 and/or the current/new unique file content identifier 142. The FIM event 150, in other words, may identify the previous/preceding file content 34 and the latest file content 34. Moreover, the endpoint cybersecurity agent 36 may be configured to periodically report the file content 34. For example, after the write events are completed and a predetermined time interval has passed without another change occurring, the endpoint cybersecurity agent 36 may again take a snapshot of the file contents 34 and send/report/upload another FIM event 150. This FIM event 150 may again be cloud stored/logged, and the FIM event 150 may report the same file content identifier 142 which matches the previous file content identifier 142 (perhaps because no OS event 110 was requested and thus the computer file 32 is unchanged since the previous report).

The FIM service 20 may thus analyze the different file contents 34. Because the file contents 34 may be enriched using the metadata 120 (such as the date/time stamp 40 and/or the file content identifier 142), the FIM service 20 may store and log the corresponding metadata 120. Indeed, the FIM service 20 may further log and identify the network storage location (such as the container 160 and/or the file content database 180). The FIM service 20 may thus inspect the service records and retrieve the desired file contents 34.

The FIM service 20 may then determine the content difference 52 and the content change 30. The FIM service 20 may send the file contents 34, the content difference 52, and/or the content change 30 to the client device 38, thus allowing the endpoint cybersecurity agent 36 and the operating system 42 to present the service results for display to the user 92 (perhaps via the GUI 104 and/or the webpage 102, as explained with reference to FIG. 6). Customers/Users of the FIM service 20 may thus view the before/after content change 30 to the computer file 32.

The user 92, for example, may request the FIM service 20. The user 92 may interact with the GUI 104 and/or the webpage 102 and make inputs that request the FIM service 20. For example, the endpoint cybersecurity agent 36 and the operating system 42 may cooperate to generate and to send the FIM request 140 (perhaps using the API 170) via an API handler to the cloud computing environment 24 (as explained with reference to FIG. 11). The FIM request 140 may specify the file contents 34 for analysis (such as by referencing the desired date/time stamps 40 and/or the file content identifiers 142). The FIM request 140, as another example, may specify a change ID that references two different file contents 34. The FIM request 140, as more examples, may additionally or alternatively specify the desired timeframe 144 for analysis. When the cloud computing environment 24 receives the FIM request 140, the FIM API 170 may identify the date/time stamps 40 and/or the file content identifiers 142 to be compared. The FIM service 20 may then retrieve the corresponding file contents 34. The FIM API 170 may further identify the user 92, the client device 38, the customer, and other metadata 120. The FIM service 20 identifies and retrieves the file contents 34 (such as from the container 160 and/or from the file content database 180).

The FIM service 20 determines the content difference 52. The FIM service 20 (such as the server 26 executing the FIM application 62) may compare the different file contents 34 and calculate the content difference 52 (such as using the hashing algorithm and hash values, as explained with reference to FIGS. 2-3). The FIM service 20, as another example, may outsource the different file contents 34 and receive the content difference 52 from a service provider (as explained with reference to FIGS. 4-5). The FIM service 20, as still more examples, may retrieve and send the file contents 34 as a response back to the FIM API handler. The FIM API handler may then compute the content difference 52 between the two or more file contents 34 and send a response back to the client device 38. The FIM service 20, as even more examples, may send/forward the two or more file contents 34 to the client device 38 (or some other network/IP address) and then allow the client device 38 to compute/arrange the content difference 52. The FIM API 170 may, or may not, be responsible for retrieving the file contents 34 from the container 160 and/or from the file content database 180. The FIM API 170 may, or may not, be responsible for data compression and encryption.

The FIM service 20 may have data retention policies. As time passes, the computer file 32 may undergo many different changes. Indeed, shared computer files may have hundreds or even thousands of changes by many different users. Over time, then, the FIM service 20 may store and log many different file contents 34, and each file content 34 consumes byte space. The FIM service 20 may thus implement one or more data retention policies that delete old file contents 34 from the container 160 and/or from the file content database 180. Content snapshots older than a certain period of time, time to live, or other retention age may be deleted.

Computer functioning is greatly improved. Malicious actors and software can ruin computer operations. The FIM service 20, though, programs the server 26 to quickly identify suspicious/malicious/abnormal file changes that minimize damage to the client device 38. Because the server 26 receives the different file contents 34 representing the computer file 32, the server 26 quickly determines the content change 30 to the computer file 32. The content change 30 may indicate suspicious/malicious/abnormal operation of the client device 38. The FIM service 20 is very fast and very simple to execute, so the FIM service 20 may determine the content difference 52 and the content change 30 in near real time. Moreover, because hash comparisons may be simple logical statements, the hardware processor 60 requires less cycles and less time to identify suspicious/malicious/abnormal file changes. Computer resources are reduced, and less electrical power is required to test for suspicious/malicious/abnormal file changes. The FIM service 20 is thus very fast and very simple, allowing the server 26 to quickly assess thousands or even millions of file contents 34 submitted by endpoint cybersecurity agents 36 operating in the field. The FIM service 20 thus greatly improves computer functioning of the server 26 when detecting suspicious/malicious/abnormal file changes.

Computer functioning is further improved. Because the FIM service 20 stores current and historical versions of the file content 34, the FIM service 20 may restore the computer file 32 to a previous/past safe version of the file content 34. Again, should the content change 30 represent abnormal/malicious client activity or other potential cybersecurity risk 54, the FIM service 20 may merely retrieve a historical file content 34 (stored prior to the operating system event 110 representing the potential cybersecurity risk 54) and send the historical file content 34 to client device 38. The FIM service 20 may further instruct the endpoint cybersecurity agent 36 to delete the current version of the file content 34 and, instead, write/save the historical file content 34. The FIM service 20 and the endpoint cybersecurity agent 36 may thus roll back the computer file 32 to the previous historical version of the file content 34 saved prior to the potential cybersecurity risk 54. The FIM service 20 may thus restore the computer file 32 and reduce or even eliminate the cybersecurity risk 54.

FIG. 18 illustrates examples of a method or operations executed by the computer system 22 for the cloud-based file integrity monitoring (FIM) service 20. The computer system 22 receives the different file contents 34 associated with the computer file 32 that were uploaded by the endpoint cybersecurity agent 36 via the cloud computing environment 24 to the cloud-based FIM service 20 (Block 200). The computer system 22 determines the content change 30 to the computer file 32 based on the different file contents 34 uploaded by the endpoint cybersecurity agent 36 to the cloud-based FIM service 20 (Block 202).

Figure 19:
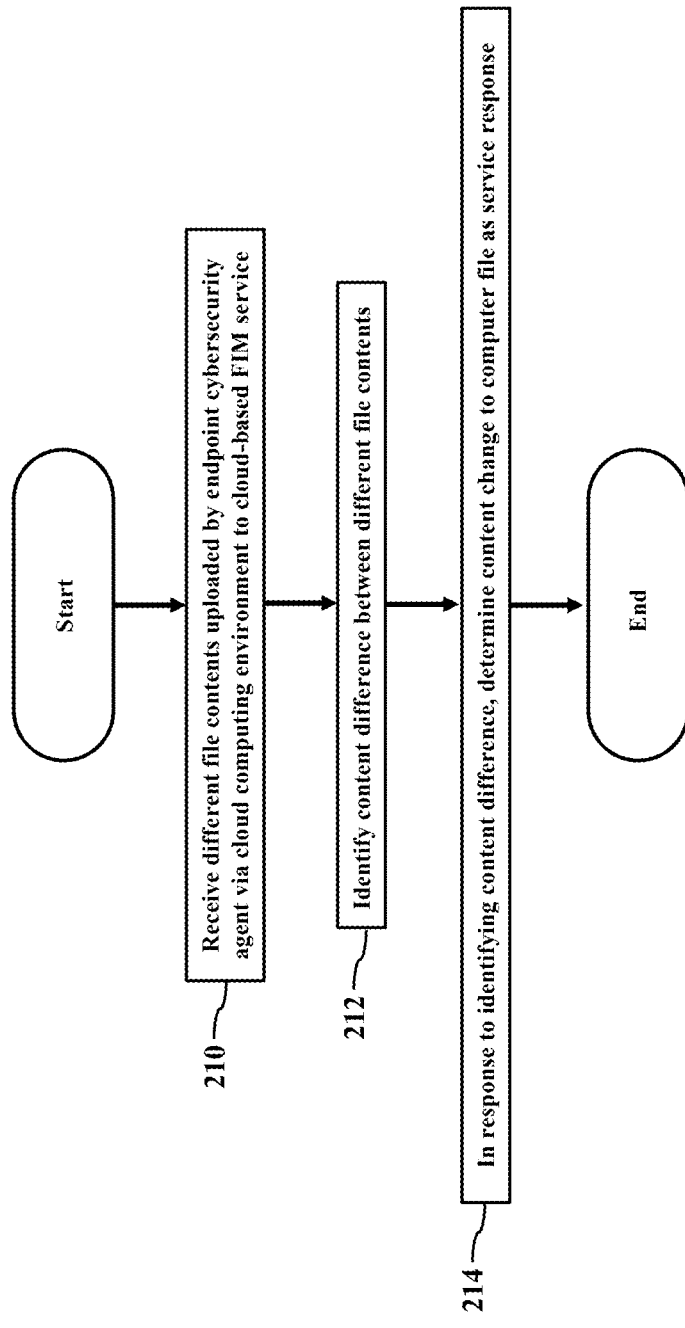

FIG. 19 illustrates examples of another method or operations for the cloud-based file integrity monitoring (FIM) service 20. The different file contents 34 associated with the computer file 32 are received, with each one of the different file contents 34 uploaded by the endpoint cybersecurity agent 36 to the cloud-based FIM service 20 (Block 210). The content difference 52 between the different file contents 34 is identified (Block 212). In response to the identifying of the content difference 52, the content change 30 to the computer file 32 is determined as a service response to the cloud-based FIM service 20 (Block 214).

FIG. 20 illustrates examples of still more method or operations for the cloud-based file integrity monitoring (FIM) service 20. The FIM events 150 generated by the endpoint cybersecurity agent 36 and sent via the cloud computing environment 24 to the FIM service 20 are received (Block 220). The file contents 34 read from the FIM events 150 are containerized (Block 222). The content difference 52 between the containerized file contents 34 is determined (Block 224). In response to determining the content difference 52, the content change 30 to the computer file 32 is determined as a service response to the cloud-based FIM service 20 (Block 226).

Figure 21:
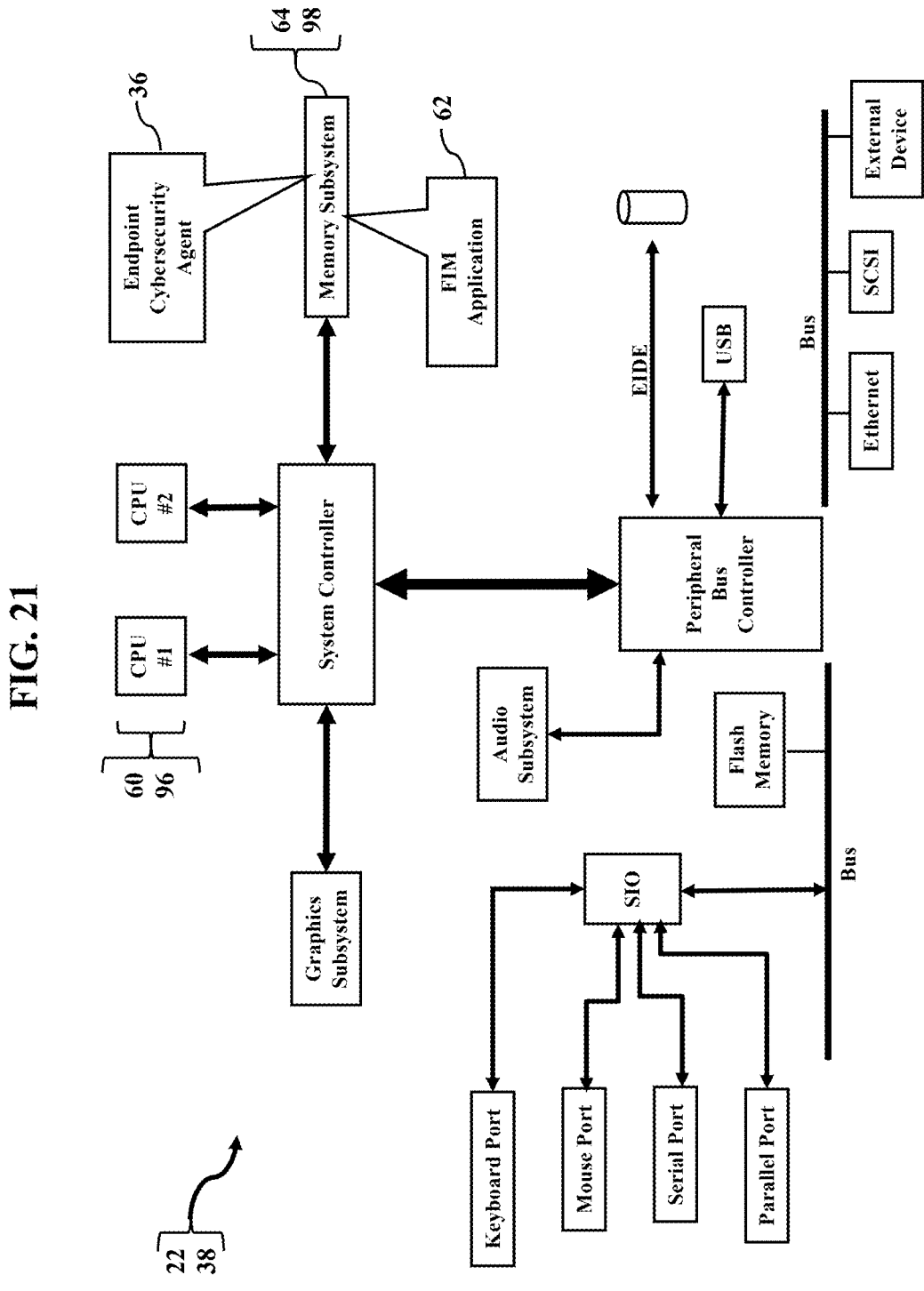
FIG. 21 illustrates a more detailed example of an operating environment.

FIG. 21 illustrates more detailed examples of the operating environment. FIG. 21 is a more detailed block diagram illustrating the computer system 22 and the client device 38. The FIM application 62 and/or the endpoint cybersecurity agent 36 is stored in the memory subsystem or device 64/98. One or more of the hardware processors 60/96 communicate with the memory subsystem or device 64/98 and execute the FIM application 62 and/or the endpoint cybersecurity agent 36. Examples of the memory subsystem or device 64/98 may include Dual In-Line Memory Modules (DIMMs), Dynamic Random Access Memory (DRAM) DIMMs, Static Random Access Memory (SRAM) DIMMs, non-volatile DIMMs (NV-DIMMs), storage class memory devices, Read-Only Memory (ROM) devices, compact disks, solid-state, and other read/write memory technology. Because the computer system 22 and the client device 38 is/are known to those of ordinary skill in the art, no detailed explanation is needed.

The computer system 22 and the client device 38 may have other embodiments. This disclosure mostly discusses the computer system 22 as the server 26 and the client device 38 as the laptop computer 94. The FIM service 20, however, may be easily adapted to other stationary or mobile computing examples, such as a desktop computer, a tablet computer, a mobile smartphone, a smartwatch, and a network switch/router. The FIM service 20 may also be easily adapted to other embodiments of smart devices, such as a television, an audio device, a remote control, and a recorder. The FIM service 20 may also be easily adapted to still more smart appliances, such as washers, dryers, and refrigerators. Indeed, as cars, trucks, and other vehicles grow in electronic usage and in processing power, the FIM service 20 may be easily incorporated into a vehicular controller.

The above examples of the FIM service 20 may be applied regardless of the networking environment. The FIM service 20 may be easily adapted to stationary or mobile devices having wide-area networking (e.g., 4G/LTE/5G/6G/7G cellular), wireless local area networking (WI-FI®), near field, and/or BLUETOOTH® capability. The FIM service 20 may be applied to stationary or mobile devices utilizing a portion of the electromagnetic spectrum and a signaling standard (such as the IEEE 802 family of standards, GSM/CDMA/TDMA or other cellular standard, and/or the ISM band). The FIM service 20, however, may be applied to a processor-controlled device operating in the radio-frequency domain and/or the Internet Protocol (IP) domain. The FIM service 20 may be applied to a processor-controlled device utilizing a distributed computing network, such as the Internet (sometimes alternatively known as the "World Wide Web"), an intranet, a local-area network (LAN), and/or a wide-area network (WAN). The FIM service 20 may be applied to a processor-controlled device utilizing power line technologies, in which signals are communicated via electrical wiring. Indeed, the many examples may be applied regardless of physical componentry, physical configuration, or communications standard(s).

The FIM service 20 may utilize a processing component, configuration, or system. For example, the FIM service 20 may be easily adapted to a desktop, mobile, or server central processing unit or chipset offered by INTEL®, ADVANCED MICRO DEVICES®, ARM®, APPLE®, TAIWAN SEMICONDUCTOR MANUFACTURING®, QUALCOMM®, or other manufacturer. The FIM service 20 may even use multiple central processing units or chipsets, which could include distributed processors or parallel processors in a single machine or multiple machines. The central processing unit or chipset can be used in supporting a virtual processing environment. The central processing unit or chipset could include a state machine or logic controller. When the central processing units or chipsets execute instructions to perform "operations," this could include the central processing unit or chipset performing the operations directly and/or facilitating, directing, or cooperating with another device or component to perform the operations.

The FIM service 20 may use packetized communications. When the computer system 22 or the client device 38 communicates via communications networks, information may be collected, sent, and retrieved. The information may be formatted or generated as packets of data according to a packet protocol (such as the Internet Protocol). The packets of data contain bits or bytes of data describing the contents, or payload, of a message. A header of each packet of data may be read or inspected and contain routing information identifying an origination address and/or a destination address.

The FIM service 20 may utilize a signaling standard. The computer system 22, the client device 38, and/or the cloud computing environment 24 may mostly use wired networks to interconnect network members. However, the computer system 22, the client device 30, and/or the cloud computing environment 24 may utilize other communications devices using the Global System for Mobile (GSM) communications signaling standard, the Time Division Multiple Access (TDMA) signaling standard, the Code Division Multiple Access (CDMA) signaling standard, the "dual-mode" GSM-ANSI Interoperability Team (GAIT) signaling standard, or a variant of the GSM/CDMA/TDMA signaling standard. The FIM service 20 may also utilize other standards, such as the I.E.E.E. 802 family of standards, the Industrial, Scientific, and Medical band of the electromagnetic spectrum, BLUETOOTH®, low-power or near-field, and other standard or value.

The FIM service 20 may be physically embodied on or in a computer-readable storage medium. This computer-readable medium, for example, may include CD-ROM, DVD, tape, cassette, floppy disk, optical disk, USB flash memory drive, solid-state device, memory card, memory drive, and large-capacity disks. This computer-readable medium, or media, could be distributed to end-subscribers, licensees, and assignees. A computer program product comprises processor-executable instructions for monitoring the file contents 34 of the computer file 32, as the above paragraphs explain.

The diagrams, schematics, illustrations, and the like represent conceptual views or processes illustrating examples of monitoring the file contents 34. The functions of the various elements shown in the figures may be provided through the use of dedicated hardware as well as hardware capable of executing instructions. The hardware, processes, methods, and/or operating systems described herein are for illustrative purposes and, thus, are not intended to be limited to a particular named manufacturer or service provider.

As used herein, the singular forms "a," "an," and "the" are intended to include the plural forms as well, unless expressly stated otherwise. It will be further understood that the terms "includes," "comprises," "including," and/or "comprising," when used in this Specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, and so on, may be used herein to describe various elements, these elements should not be limited by these terms. These terms are only used to distinguish one element from another. For example, a first computer or container could be termed a second computer or container and, similarly, a second device could be termed a first device without departing from the teachings of the disclosure.

The invention claimed is:

1. A method executed by a computer system for a cloud-based file integrity monitoring (FIM) service, comprising:
    receiving, by the computer system, a file content associated with a computer file, the file content uploaded by an endpoint cybersecurity agent to the cloud-based FIM service in response to detecting an event;
    determining, by the computer system, a cybersecurity risk in response to a content change to the computer file based on different file contents uploaded by the endpoint cybersecurity agent to the cloud-based FIM service;
    determining, by the computer system, a historical file content associated with the computer file stored prior to the event;
    sending, by the computer system, the historical file content stored prior to the event to the endpoint cybersecurity agent; and
    rolling back, by the computer system, a safe version of the computer file by instructing the endpoint cybersecurity agent to restore the historical file content stored prior to the event.

2. The method of claim 1, further comprising determining a content difference between the different file contents.

3. The method of claim 1, further comprising determining a content difference between the different file contents by comparing the different file contents uploaded by the endpoint cybersecurity agent to the cloud-based FIM service.

4. The method of claim 1, further comprising sending a content difference between the different file contents to the endpoint cybersecurity agent as a service response of the cloud-based FIM service.

5. The method of claim 1, further comprising distributing a FIM configuration to a client device hosting the endpoint cybersecurity agent.

6. The method of claim 1, further comprising determining a file system path associated with the computer file based on at least one of the different file contents.

7. The method of claim 1, further comprising decompressing at least one of the different file contents.

8. The method of claim 1, further comprising decrypting at least one of the different file contents.

9. The method of claim 1, further comprising containerizing the different file contents.

10. A computer system for a cloud-based file integrity monitoring (FIM) service, comprising:
    at least one central processing unit; and
    at least one memory device storing instructions that, when executed by the at least one central processing unit, perform operations, the operations comprising:
    receiving different timestamped byte file contents associated with a computer file, each one of the different timestamped byte file contents uploaded by an endpoint cybersecurity agent to the cloud-based FIM service in response to detecting an FIM event;
    identifying a byte difference between the different timestamped byte file contents uploaded by the endpoint cybersecurity agent to the cloud-based FIM service;
    in response to the identifying of the byte difference between the different file contents, determining the byte difference indicates a potential cybersecurity risk associated with the computer file;
    in response to the determining that the byte difference indicates the potential cybersecurity risk, determining a safe historical file content of the different timestamped byte file contents stored prior to the FIM event;
    sending the safe historical file content stored prior to the FIM event to the endpoint cybersecurity agent; and
    rolling back to the safe historical file content by instructing the endpoint cybersecurity agent to restore the safe historical file content stored prior to the FIM event.

11. The computer system of claim 10, wherein the operations further comprise determining the content difference between the different file contents by comparing the different file contents uploaded by the endpoint cybersecurity agent to the cloud-based FIM service.

12. The computer system of claim 10, wherein the operations further comprise outsourcing the different file contents from the cloud-based FIM service to a service provider that determines the content difference.

13. The computer system of claim 10, wherein the operations further comprise distributing a FIM configuration to a client device hosting the endpoint cybersecurity agent.

14. The computer system of claim 10, wherein the operations further comprise determining a file system path associated with the computer file.

15. The computer system of claim 10, wherein the operations further comprise decompressing at least one of the different file contents.

16. The computer system of claim 10, wherein the operations further comprise decrypting at least one of the different file contents.

17. The computer system of claim 10, wherein the operations further comprise containerizing the different file contents.

18. A memory device storing instructions that, when executed by at least one central processing unit, perform operations for a file integrity monitoring (FIM) service, comprising:
    receiving FIM events generated by an endpoint cybersecurity agent and sent via a cloud computing environment to the FIM service;
    containerizing file contents read from the FIM events generated by the endpoint cybersecurity agent;

determining a content difference between the containerized file contents read from the FIM events generated by the endpoint cybersecurity agent;

in response to the determining of the content difference between the containerized file contents, determining a content change associated with a computer file;

determining the content change associated with the computer file represents a cybersecurity risk;

retrieving a safe historical file content associated with the computer file stored prior to an FIM event of the FIM events that represents the cybersecurity risk;

sending the safe historical file content stored prior to the FIM event to the endpoint cybersecurity agent; and rolling back to the safe historical file content by instructing the endpoint cybersecurity agent to restore the safe historical file content stored prior to the FIM event that represents the cybersecurity risk.

19. The memory device of claim 18, wherein the operations further comprise decompressing at least one of the containerized file contents.

20. The memory device of claim 18, wherein the operations further comprise decrypting at least one of the containerized file contents.

* * * * *